US011788500B2

(12) United States Patent
Nook et al.

(10) Patent No.: US 11,788,500 B2
(45) Date of Patent: Oct. 17, 2023

(54) BATTERY DEVICE FOR A BATTERY JUMP STARTING DEVICE

(71) Applicant: THE NOCO COMPANY, Glenwillow, OH (US)

(72) Inventors: Jonathan Lewis Nook, Gates Mills, OH (US); William Knight Nook, Sr., Shaker Heights, OH (US); James Richard Stanfield, Peoria, AZ (US); Derek Michael Underhill, Tempe, AZ (US)

(73) Assignee: The Noco Company, Glenwillow, OH (US)

( * ) Notice: Subject to any disclaimer, the term of this patent is extended or adjusted under 35 U.S.C. 154(b) by 0 days.

(21) Appl. No.: 15/989,005

(22) Filed: May 24, 2018

(65) Prior Publication Data

US 2018/0269703 A1   Sep. 20, 2018

Related U.S. Application Data

(63) Continuation of application No. PCT/US2017/017289, filed on Feb. 10, 2017, which
(Continued)

(51) Int. Cl.
| | | |
|---|---|---|
| *F02N 11/12* | (2006.01) | |
| *H01M 10/42* | (2006.01) | |
| *H02J 7/34* | (2006.01) | |
| *H01M 50/50* | (2021.01) | |
| *H02J 1/10* | (2006.01) | |

(Continued)

(52) U.S. Cl.
CPC .......... *F02N 11/12* (2013.01); *H01M 10/425* (2013.01); *H01M 50/211* (2021.01); *H01M 50/298* (2021.01); *H01M 50/50* (2021.01); *H01M 50/548* (2021.01); *H01M 50/553* (2021.01); *H02J 1/122* (2020.01); *H02J 7/342* (2020.01);
(Continued)

(58) Field of Classification Search
CPC ...................................................... H02J 7/342
See application file for complete search history.

(56) References Cited

U.S. PATENT DOCUMENTS

| 4,142,771 A | * | 3/1979 | Barnes ................... H01R 4/184 |
| | | | 174/84 C |
| 4,972,135 A | | 11/1990 | Bates et al. |
| | | | (Continued) |

FOREIGN PATENT DOCUMENTS

| CN | 102414923 | 4/2012 |
| CN | 103035874 | 4/2013 |
| | (Continued) | |

OTHER PUBLICATIONS

Patent Cooperation Treaty, Appl. PCT/US2016/024680, International Search Report, dated Jun. 24, 2016.
(Continued)

*Primary Examiner* — Drew A Dunn
*Assistant Examiner* — Tynese V McDaniel
(74) *Attorney, Agent, or Firm* — Jones Day

(57) ABSTRACT

An enhanced conductivity battery device for use in a battery jump starting device. The enhanced conductivity device providing enhanced conductivity from the enhanced conductivity device to a battery being jump started.

27 Claims, 28 Drawing Sheets

Related U.S. Application Data is a continuation-in-part of application No. PCT/US2016/024680, filed on Mar. 29, 2016, and a continuation-in-part of application No. 15/137,626, filed on Apr. 25, 2016, now Pat. No. 11,601,004.

(60) Provisional application No. 62/294,067, filed on Feb. 11, 2016, provisional application No. 62/424,297, filed on Nov. 18, 2016.

(51) Int. Cl.
*H01M 50/548* (2021.01)
*H01M 50/553* (2021.01)
*H01M 50/211* (2021.01)
*H01M 50/298* (2021.01)
*H01R 11/24* (2006.01)
*F02N 11/14* (2006.01)

(52) U.S. Cl.
CPC ......... *F02N 11/14* (2013.01); *H01M 2220/20* (2013.01); *H01R 11/24* (2013.01)

(56) References Cited

U.S. PATENT DOCUMENTS

| | | | |
|---|---|---|---|
| 4,990,723 A * | 2/1991 | Ziberna | A47J 37/0745 174/152 R |
| 5,367,243 A | 11/1994 | Wells et al. | |
| 5,707,257 A | 1/1998 | Kotajima et al. | |
| 5,716,735 A * | 2/1998 | Muffoletto | H01M 50/54 429/161 |
| 6,002,235 A | 12/1999 | Clore | |
| 6,130,519 A | 10/2000 | Witing et al. | |
| 6,215,273 B1 * | 4/2001 | Shy | H01M 2/1022 320/105 |
| 6,222,342 B1 * | 4/2001 | Eggert | H02J 7/0045 307/66 |
| 6,300,742 B1 | 10/2001 | Hung | |
| 6,384,573 B1 | 5/2002 | Dunn | |
| 6,679,708 B1 | 1/2004 | Depp et al. | |
| 9,007,015 B1 | 4/2015 | Nook et al. | |
| 9,070,938 B2 * | 6/2015 | Hashimoto | H01G 11/74 |
| 9,537,136 B2 * | 1/2017 | Ryu | H01M 50/543 |
| 10,084,173 B2 * | 9/2018 | Ha | H01M 50/502 |
| 10,128,483 B2 * | 11/2018 | Lee | H01M 50/531 |
| 2004/0106038 A1 * | 6/2004 | Shimamura | H01M 50/543 429/152 |
| 2004/0130298 A1 | 7/2004 | Krieger et al. | |
| 2004/0150373 A1 | 8/2004 | Chan | |
| 2005/0213867 A1 | 9/2005 | Rajendran et al. | |
| 2005/0255378 A1 | 11/2005 | Knight et al. | |
| 2006/0071631 A1 * | 4/2006 | Cheung | H02J 7/342 320/105 |
| 2006/0244412 A1 | 11/2006 | Bonzer et al. | |
| 2007/0178777 A1 | 8/2007 | Miekka | |
| 2008/0131764 A1 * | 6/2008 | Saiki | H01M 2/1083 429/149 |
| 2010/0001682 A1 | 1/2010 | Dickson et al. | |
| 2010/0244766 A1 | 9/2010 | Olsberg | |
| 2011/0117408 A1 * | 5/2011 | Lennox | H01M 2/0277 429/99 |
| 2011/0140651 A1 | 6/2011 | Dai | |
| 2011/0268996 A1 * | 11/2011 | Lee | H01M 10/04 429/7 |
| 2012/0126818 A1 | 5/2012 | Ishahara | |
| 2012/0295150 A1 * | 11/2012 | Gao | H01M 50/557 429/158 |
| 2013/0164613 A1 * | 6/2013 | Hashimoto | H01G 11/74 429/211 |
| 2013/0241498 A1 | 9/2013 | Koebler | |
| 2013/0295444 A1 * | 11/2013 | Kim | H01M 50/54 429/179 |
| 2014/0030558 A1 * | 1/2014 | Ryu | H01M 10/425 429/7 |
| 2014/0045001 A1 | 2/2014 | Yang | |
| 2014/0113463 A1 * | 4/2014 | Peterson | H01R 12/73 439/77 |
| 2014/0139175 A1 * | 5/2014 | Gonzalez | H01M 2/206 320/101 |
| 2015/0037658 A1 | 2/2015 | Maeda et al. | |
| 2015/0087182 A1 | 3/2015 | Zhao et al. | |
| 2015/0236329 A1 * | 8/2015 | Okuda | H01G 11/12 429/178 |
| 2015/0380697 A1 * | 12/2015 | Osborne | H01M 50/502 429/91 |
| 2016/0001666 A1 | 1/2016 | Nook et al. | |
| 2016/0049819 A1 | 2/2016 | Butler et al. | |
| 2016/0141728 A1 * | 5/2016 | Fauteux | H01M 2/0212 429/61 |
| 2016/0155996 A1 * | 6/2016 | Dai | H01M 50/538 429/179 |
| 2016/0181587 A1 * | 6/2016 | Koebler | H01M 2/34 429/7 |
| 2017/0222272 A1 * | 8/2017 | Takami | H01M 4/5825 |
| 2017/0309872 A1 * | 10/2017 | Kuboki | H01M 50/20 |

FOREIGN PATENT DOCUMENTS

| | | |
|---|---|---|
| CN | 104488111 | 4/2015 |
| CN | 104617250 | 5/2015 |
| CN | 104795527 | 7/2015 |
| CN | 204516832 | 7/2015 |
| CN | 204966731 | 1/2016 |
| DE | 102010062708 | 6/2012 |
| EP | 2105980 | 9/2009 |
| EP | 2388845 | 11/2011 |
| EP | 2575189 | 4/2013 |
| EP | 2605313 | 6/2013 |
| FR | 2814001 | 3/2002 |
| JP | 2002-141056 | 5/2002 |
| JP | 2003-112586 | 4/2003 |
| JP | 2006-286385 | 10/2006 |
| JP | 2008-146998 | 6/2008 |
| JP | 2010-251052 | 11/2010 |
| JP | 2011-023249 | 2/2011 |
| JP | 2012-004106 | 1/2012 |
| JP | 2012-077160 | 4/2012 |
| JP | 2012-230962 | 11/2012 |
| JP | 2014-523623 | 9/2014 |
| JP | 2015-072878 | 4/2015 |
| JP | 2015-115979 | 6/2015 |
| JP | 2015-153676 | 8/2015 |
| WO | WO 2006/057497 | 6/2006 |
| WO | WO 2012/074548 | 6/2012 |
| WO | WO 2012/081140 | 6/2012 |
| WO | WO 2015/195321 | 12/2015 |

OTHER PUBLICATIONS

Patent Cooperation Treaty, Appl. PCT/US2017/017289, International Search Report and Written Opinion, dated May 4, 2017.

IP Australia, Appl. 2021254622, Examination Report, dated Oct. 19, 2022.

IP Australia, Appl. 2020200268, Examination Report, dated Mar. 31, 2021.

IP Australia, Appl. 2020277175, Examination Report, dated Nov. 18, 2021.

IP Australia, Appl. 2020277175, Examination Report, dated Aug. 12, 2022.

Canadian Patent Office, Appl. 3,005,971, Examination Report, dated Nov. 29, 2019.

Canadian Patent Office, Appl. 3,005,971, Examination Report, dated Aug. 18, 2020.

Canadian Patent Office, Appl. 3,005,971, Examination Report, dated Apr. 21, 2021.

Canadian Patent Office, Appl. 3,107,432, Examination Report, dated Jan. 19, 2022.

Canadian Patent Office, Appl. 3,107,432, Examination Report, dated Oct. 5, 2022.

(56) References Cited

OTHER PUBLICATIONS

Canadian Patent Office, Examination Report, Application No. 3,107,432, dated Oct. 5, 2022.
Chinese Patent Office, Appl. 201680002479.X, Office Action, dated Apr. 20, 2020.
Chinese Patent Office, Appl. 201680002479.X, Office Action, dated Feb. 3, 2021.
Chinese Patent Office, Appl. 201680002479.X, Office Action, dated May 18, 2021.
Chinese Patent Office, Appl. 201680002479.X, Office Action, dated Apr. 3, 2023.
Chinese Patent Office, Appl. 201780010937.9, Office Action, dated Dec. 19, 2019.
Chinese Patent Office, Appl. 201780010937.9, Office Action, dated Jul. 13, 2020.
Chinese Patent Office, Appl. 201780010937.9, Office Action, dated Jan. 5, 2021.
Chinese Patent Office, Appl. 201780010937.9, Office Action, dated Jul. 1, 2021.
European Patent Office, Appl. 16831887.1, Extended European Search Report, dated Feb. 26, 2020.
European Patent Office, Appl. 16831887.1, Communication Pursuant to Article 94(3), dated Sep. 20, 2022.
European Patent Office, Appl. 17750799.3, Communication Pursuant to Article 94(3), dated Jan. 28, 2022.
European Patent Office, Appl. 19209245.0, Extended European Search Report, dated Apr. 20, 2020.
European Patent Office, Appl. 18181486.4, Communication Pursuant to Article 94(3), dated Jan. 28, 2022.
German Patent Office, Appl. 11 2016 007 604.5, Office Action, dated Feb. 14, 2022.
Japan Patent Office, Appl. 2017-561919, Office Action, dated Nov. 30, 2020.
Japan Patent Office, Appl. 2017-561919, Office Action, dated Apr. 6, 2021.
Japan Patent Office, Appl. 2020-056227, Office Action, dated Apr. 6, 2021.
Japan Patent Office, Appl. 2020-056227, Office Action, dated Dec. 14, 2021.
Japan Patent Office, Appl. 2020-056227, Office Action, dated Jul. 4, 2022.
Japan Patent Office, Appl. 2020-167183, Office Action, dated Aug. 10, 2021.
Japan Patent Office, Appl. 2020-167183, Office Action, dated Apr. 12, 2022.
UK Patent Office, Appl. GB1718653.7, Examination Report, dated May 29, 2020.
UK Patent Office, Appl. GB1813107.8, Search and Examination Report, dated Sep. 7, 2020.
UK Patent Office, Appl. GB2018012.1, Search and Examination Report, dated May 13, 2021.
UK Patent Office, Appl. GB2100281.1, Search and Examination Report, dated Feb. 22, 2021.
UK Patent Office, Appl. GB2100281.1, Examination Report, dated Apr. 30, 2021.
UK Patent Office, Appl. GB2108126.0, Search and Examination Report, dated Jul. 5, 2021.

\* cited by examiner

BATTERY DEVICE FOR A BATTERY JUMP STARTING DEVICE

FIELD

A portable battery connector device, for example, a battery connector arrangement or assembly for a battery jump starting device, in particular a portable vehicle jump starting apparatus, configured for enhancing the conductivity between the battery of the jump starting apparatus and a battery being charged.

BACKGROUND

The exists a portable vehicle battery jump start apparatus as disclosed in U.S. Pat. No. 9,007,015 to Nook et al. The apparatus utilizes a lithium ion battery pack. In this type of apparatus, there exists a need to maximize conductivity from the battery pack to the vehicle battery of the vehicle being jump started.

For successful car jump-starts, there are two main factors dictating the results. The first factor is the amount of power provided by the lithium ion battery pack, and the second factor is the maximum conductivity. You need both factors to have the best chance to jump-start big engines. One factor without the other factor is not enough.

SUMMARY

The presently described subject matter is directed to a battery device, for example, a battery connector, battery connector arrangement, or battery conductor assembly for use in a device for jump starting a vehicle, and a device for jump starting a vehicle comprising the battery connector device.

The presently described subject matter is directed to a battery connector device comprising or consisting of a battery having at least one battery conductor connected to a terminal of the battery.

The presently described subject matter is directed to a battery connector device comprising or consisting of a battery having at least one battery conductor or cable connected to a battery tab of the battery.

The presently described subject matter is directed to a battery connector device comprising or consisting of a battery having a positive conductor and a negative conductor connected to the battery.

The presently described subject matter is directed to a battery connector device comprising or consisting of a battery having a positive conductor plate and/or a negative conductor plate connected to the battery.

The presently described subject matter is directed to a battery connector device comprising or consisting of a battery having a positive conductor plate and/or a negative conductor plate connected to the battery, and a positive cable connected to the positive conductor plate and/or a negative cable connected to the negative conductor plate.

The presently described subject matter is directed to a battery connector device comprising or consisting of a battery having a positive battery conductor connected to a positive terminal of the battery and/or a negative battery conductor connected to a negative terminal of the battery.

The presently described subject matter is directed to a battery connector device comprising or consisting of a battery having a positive battery conductor connected to a positive terminal contact of the battery and/or a negative battery conductor connected to a negative terminal contact of the battery, the battery conductors being soldered to the respective terminals of the battery.

The presently described subject matter is directed to a battery connector device comprising or consisting of a battery having a positive battery conductor connected to a positive terminal of the battery and/or a negative battery conductor connected to a negative terminal contact of the battery, and a relay connected to one of the battery conductors of the battery.

The presently described subject matter is directed to a battery connector device comprising or consisting of a battery having a positive battery conductor connected to a positive terminal contact of the battery and/or a negative battery conductor connected to a negative terminal contact of the battery, and a relay connected to the negative battery conductor.

The presently described subject matter is directed to a battery connector device comprising or consisting of a battery having a positive battery conductor connected to a positive terminal contact of the battery and/or a negative battery conductor connected to a negative terminal contact of the battery, and a relay connected to the negative battery conductor.

The presently described subject matter is directed to a battery connector device comprising or consisting of a battery having a positive battery conductor connected to a positive terminal contact of the battery and/or a negative battery conductor connected to a negative terminal contact of the battery, and multiple relays connected to the negative battery conductor.

The presently described subject matter is directed to a battery connector device comprising or consisting of a battery having a positive battery conductor connected to a positive terminal contact of the battery and/or a negative battery conductor connected to a negative terminal contact of the battery, and a positive cable connected to the positive battery conductor.

DETAILED DESCRIPTION

Figure 1:
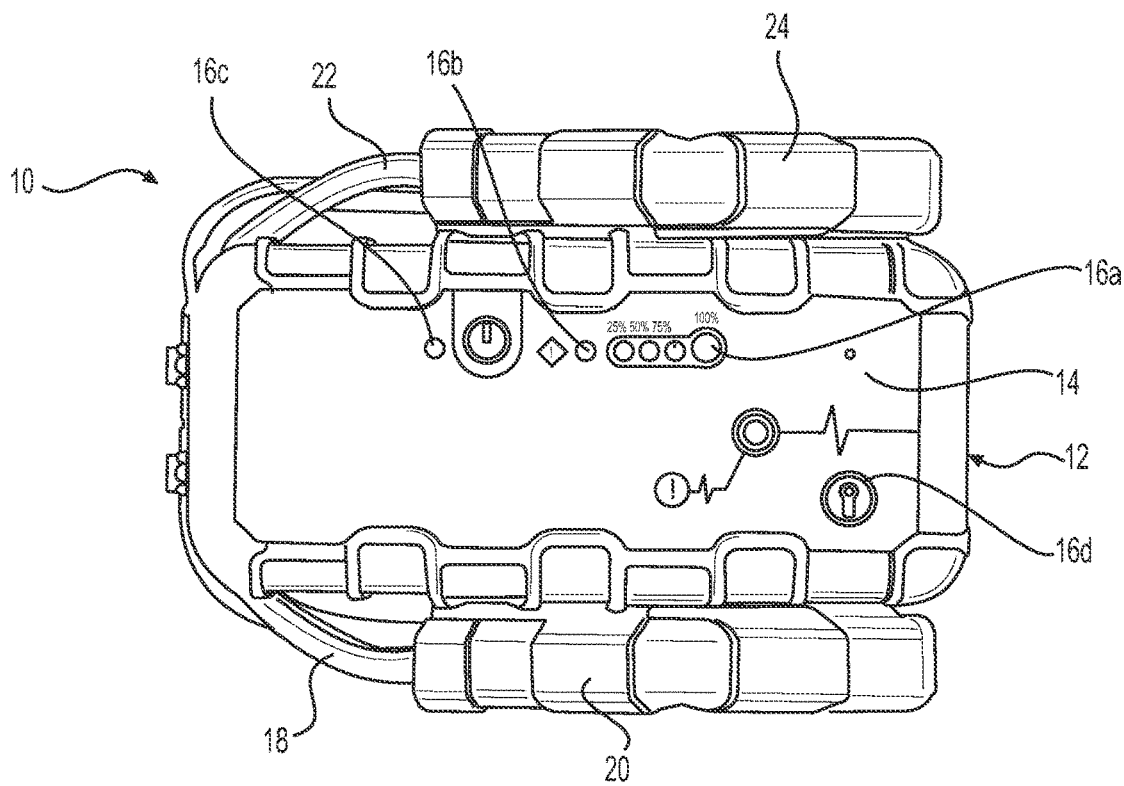
FIG. 1 is a front view of the battery jump starting device with the clamps un-deployed.
Figure 2:
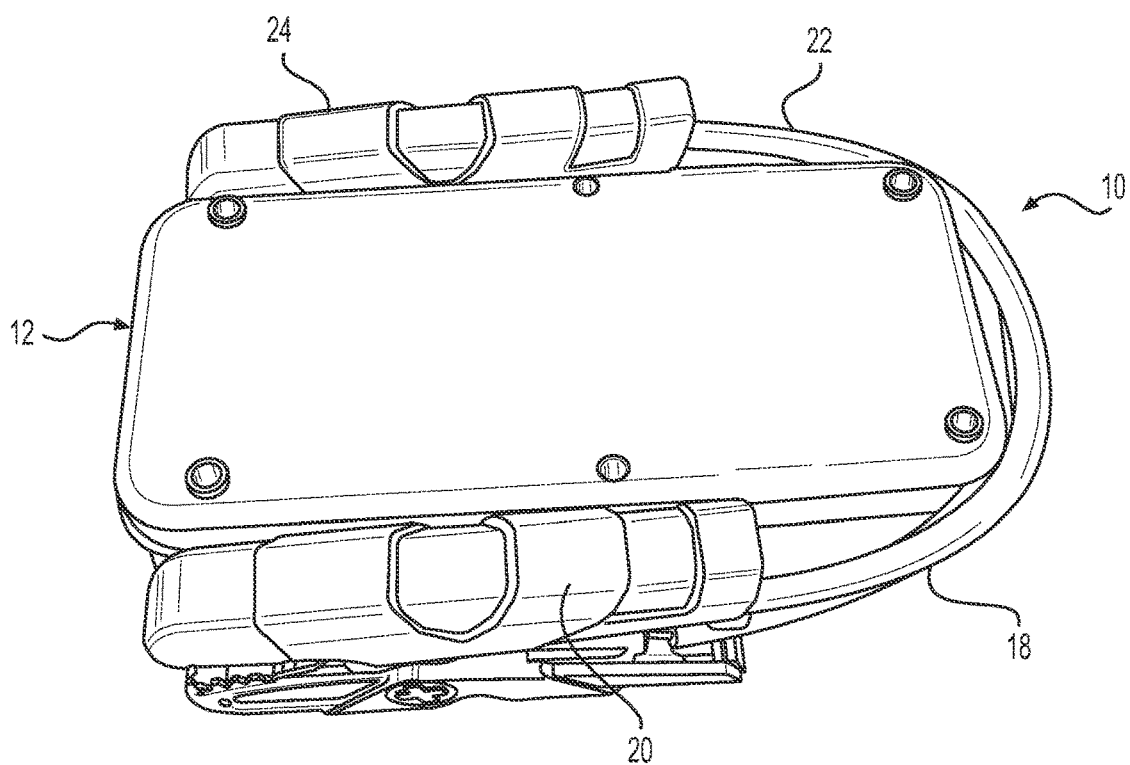
FIG. 2 is a rear perspective view of the battery jump starting device shown in FIG. 1.
Figure 3:
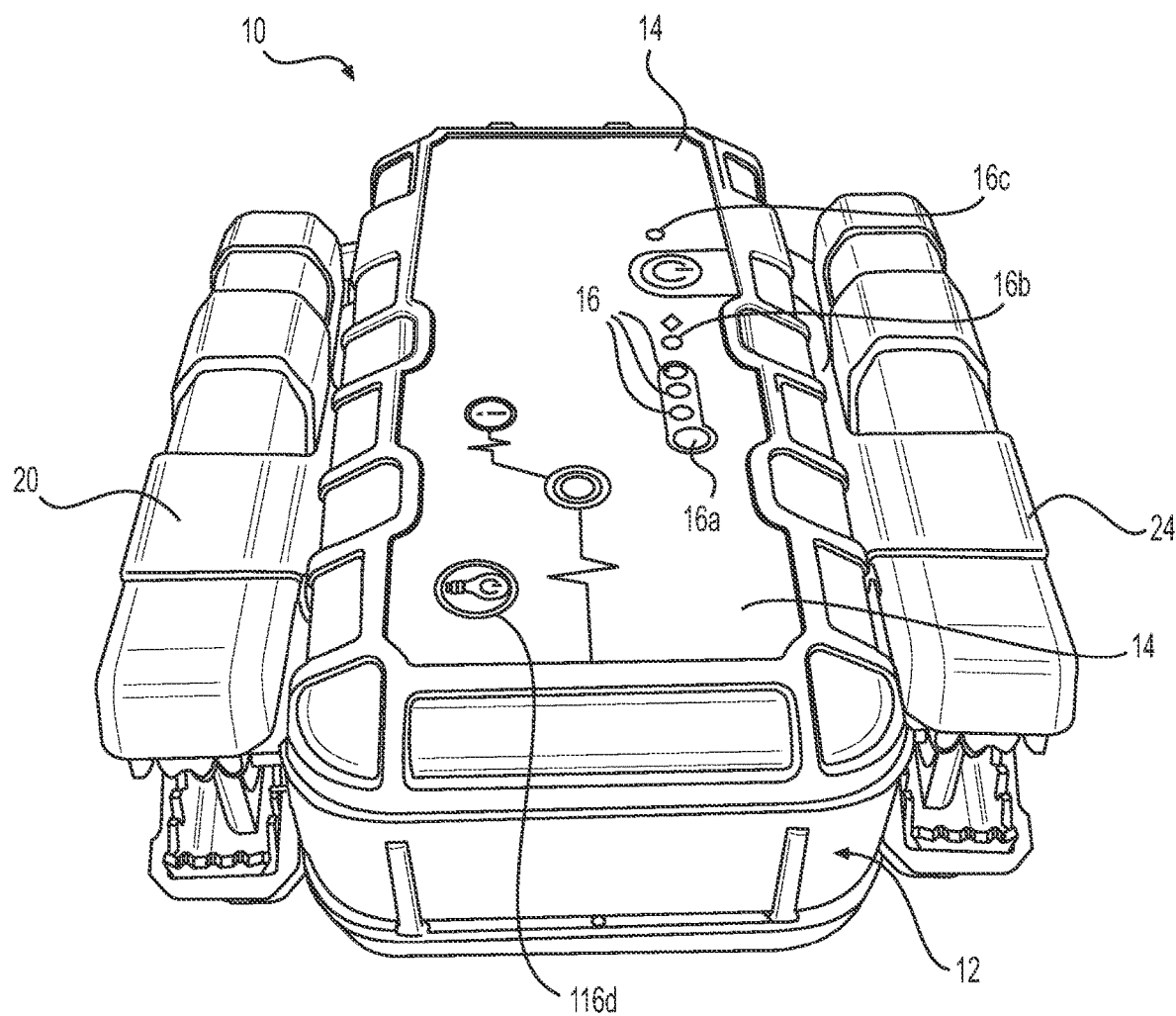
FIG. 3 is an end perspective view of the battery jump starting device shown in FIGS. 1 and 2.
Figure 4:
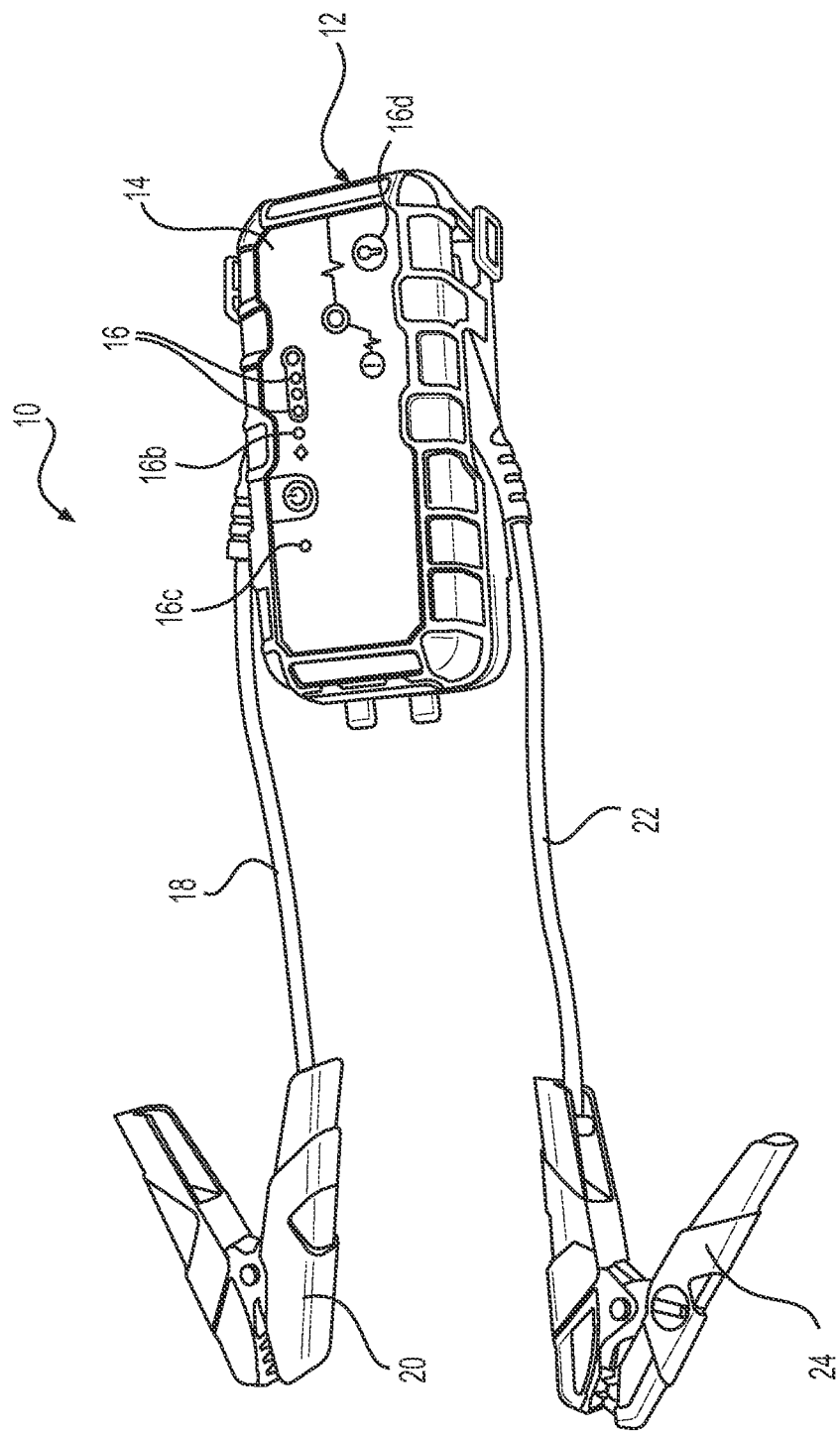
FIG. 4 is a front perspective view of the battery jump starting device shown in FIG. 1, however, with the clamps deployed.

A battery jump starting device 10 is shown in FIGS. 1 and 2. The battery jump starting device 10 comprises a casing 12 having a display 14 provided with an arrangement of light emitting diodes (LEDs) 16.

The battery jump starting device 10 further comprises a positive cable 18 having a positive clamp 20 and a negative cable 22 having a negative clamp 24. The positive cable 18 and negative cable 22 pass through openings 12a, 12b, respectively, in the casing 12.

The clamps 20, 24 are stowed away or docked in an un-deployed mode by clamping each to a respective side posts 26 extending outwardly on opposite sides of the casing 12, as shown in FIG. 1. The side posts 26 are shown in FIG. 2. The clamps 20, 24 are docked when the battery jump starting device 10 is in non-use, and then unclamped from the side post 26 during use.

The battery jump starting device 10 is configured to Jump start a vehicle battery. For example, the battery jump starting device 10 can be the PORTABLE VEHICLE JUMP START APPARATUS WITH SAFETY PROTECTION disclosed in U.S. Pat. No. 9,007,015, which is fully incorporated herein by reference, or a device or apparatus similar thereto.

The battery jump starting device 10 comprises electrical components or parts located inside the casing 12. For example, the battery jump starting device 10 comprises a battery connector device 100 shown in FIGS. 3-9.

The battery connector device 100 comprises a battery assembly 110 having a battery 112. For example, the battery 112 is a lithium ion rechargeable type battery. The battery connector device 100 is configured to maximize conductivity from the battery 112 to the cables 18, 22 and clamps 20, 24 of the battery jump starting device 10. The battery 112 comprises a battery casing 112a, for example, a rectangular-shaped battery casing 112a.

The battery 112 comprises a positive terminal tab at one end (e.g. width) of the battery 112, and a negative terminal tab at an opposite end (e.g. width) of the battery 112. For example, the battery 112 comprises one or more battery cells each having a positive and negative tab. For example, the positive tab from one battery cell is located at the one end of the battery 112 and the negative tab from one battery cell is located at the opposite end of the battery 112. A positive terminal conductor bar 114 is connected (e.g. soldered, welded, or sonically welded) at the one end of the battery 112 to the positive terminal tab (i.e. contact) of the battery 112. The positive terminal conductor bar 114 extends along the one end (e.g. width) of the battery 112.

The positive cable 18 can be connected (e.g. directly connected by soldering) to the positive terminal conductor bar 114 and/or the positive terminal tab of the battery 112. For example, the positive terminal conductor bar 114 can be provided with a conductive loop 116 wrapping around (e.g. entirely wrapping around) and connected (e.g. crimped and/or soldered) to an exposed end 18a of the positive cable 18. For example, the positive terminal conductor bar 114 is made from heavy gauge copper sheet (e.g. machined, cut, or stamped therefrom).

Figure 5:
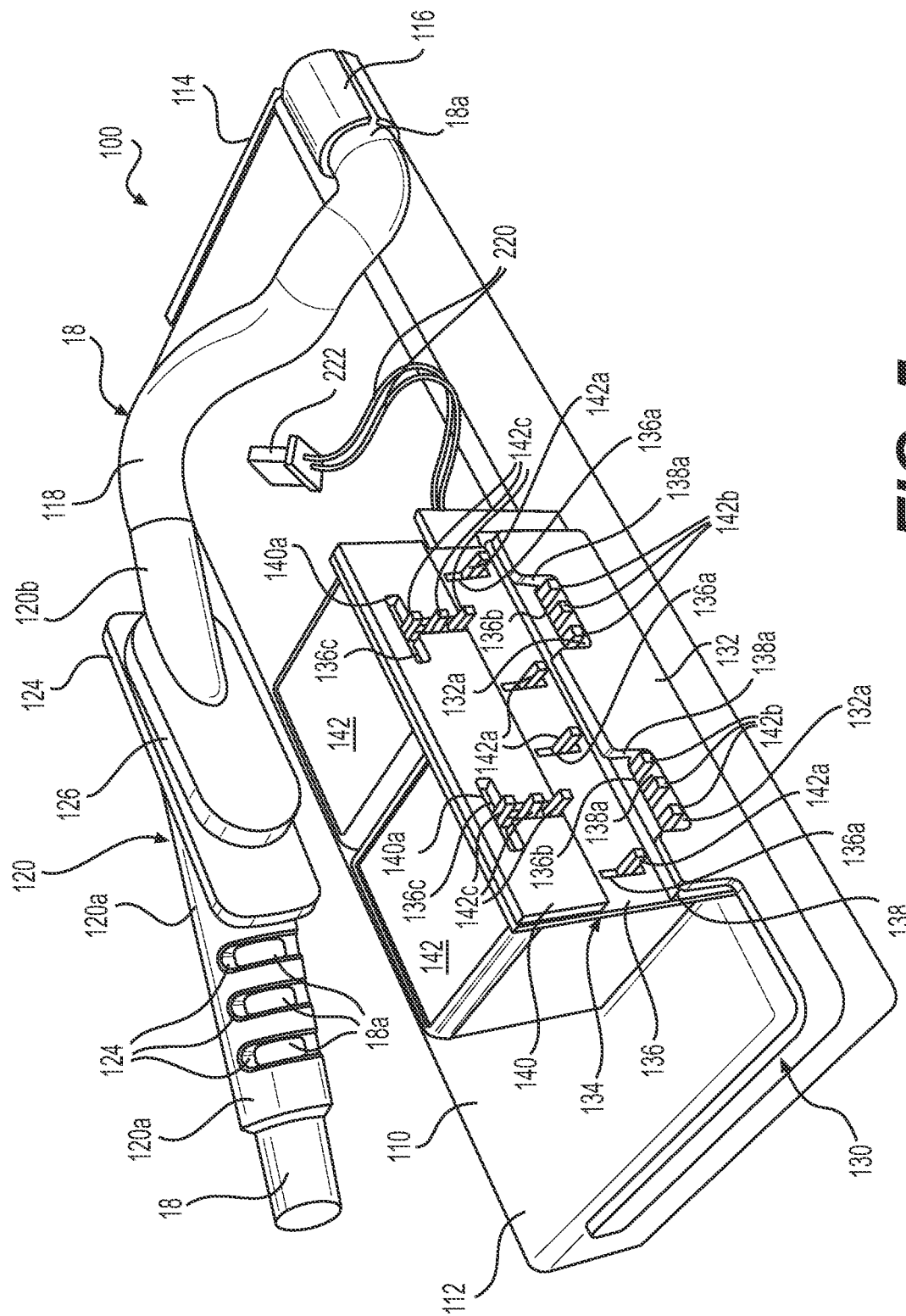
FIG. 5 is a front perspective view of a battery connector device contained within the battery jump starting device shown in FIG. 1, however, with the negative cable not yet installed.
Figure 6:
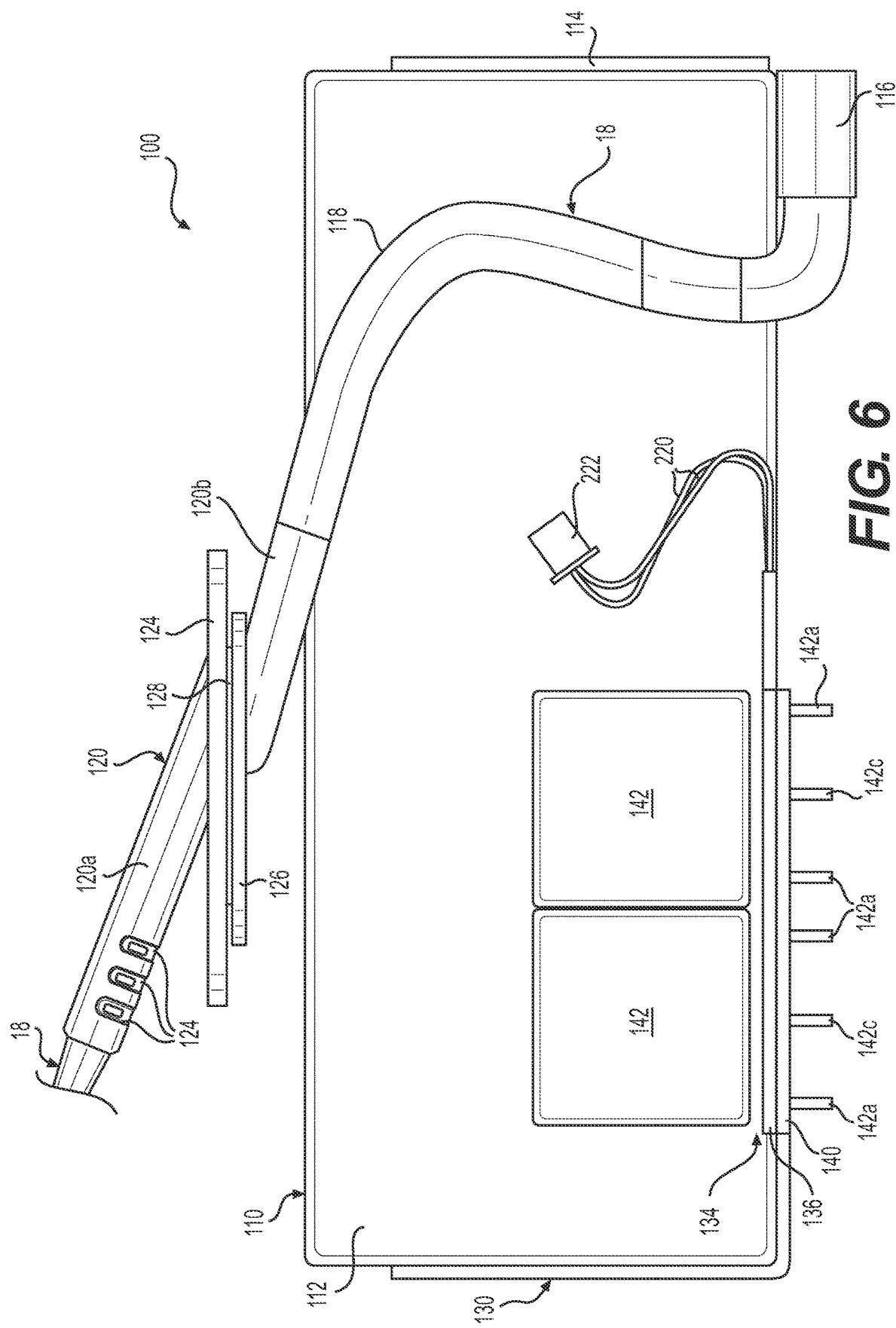
FIG. 6 is a top planer view of the battery connector device shown in FIG. 5.

As shown in FIGS. 5 and 6, the positive terminal conductor bar 114 can be configured (e.g. bent) to wrap around one of the square-shaped corners of the battery casing 112a of the battery 112 (e.g. L-shaped). The L-shaped positive terminal conductor bar 114 can extend along an end of the battery 112 and along at least a portion of the side of the battery 112, as shown in FIG. 5.

The positive terminal conductor bar 114 can also be mechanically coupled and/or adhered to the outer surface of the battery casing 112a to provide additional support and stability thereof (e.g. assembled to survive mechanical shock when drop testing the battery jump starting device 10). For example, the positive terminal conductor bar 114 can be mechanically connected to the battery casing 112a by adhesive (e.g. silicon adhesive), double sided tape, double sided foam tape, insulated plastic or ceramic connector with snap fit connection and/or adhesive connection, and/or the battery casing 112a can be formed (e.g. molded) to mechanically connect (e.g. snap fit or interference connection) with the positive terminal conductor bar 114.

The positive cable 18 can be a single piece of wire or a cable (e g twisted or braided wires) extending from the battery assembly 110 to the positive clamp 20. Specifically, one end of the positive cable 18 is connected to the positive terminal conductor bar 114 connected to the battery 18, and the opposite end of the positive cable 18 is connected to the positive clamp 20.

More specifically, the positive cable 18 can comprise a flexible or bent cable portion 118 for changing the direction of the positive cable 18 within the casing 12. The positive cable 18 can be fitted with a flexible outer sleeve portion 120 transitioning into a flexible inner sleeve portion 122 to flexibly accommodate the positive cable 18 passing through the casing 12. The flexible outer sleeve portion 120 is externally located relative to the casing 12 of the battery jump starting device 10, and the flexible inner sleeve portion 122 is internally located relative to the casing 12 of the battery jump starting device 10.

The flexible outer sleeve portion 120 is configured to reinforce the connection between the positive cable 18 and the casing 12 of the battery jump starting device while remaining flexible. For example, the flexible outer sleeve portion 120 is provided with one or more grooves 124 (e.g. three (3) shown in FIG. 5) exposing portions of the positive cable 18. The one or more grooves 124 act as hinges to ease bending of the positive cable 18 within the flexible outer sleeve portion 120.

The flexible outer sleeve portion 120 comprises an outer flange 124 spaced apart (e.g. a small distance equal to about a wall thickness of the casing 12 of the battery jump starting device 10) from an in inner flange 126. The outer and inner flanges 124, 126 further anchor the positive cable 18 to the casing 12 of the battery jump starting device 10.

The flexible outer sleeve portion 120 comprises a sleeve portion 128 (FIG. 6) connecting together the outer flange 124 and inner flange 126. For example, the flexible outer sleeve portion 120 is molded or applied onto and around the positive cable 18 as a single unit (e.g. the flexible outer sleeve portion 120 is molded onto a portion of the positive cable 18 inserted within the mold during the molding process). Alternatively, the flexible outer sleeve portion 120 is made (e.g. molded) separately, and then installed or assembled onto a portion of the positive cable 18.

The positive cable 18 comprises an inner conductor 18b (e.g. single wire conductor, twisted wires, or braided wires) disposed within an outer insulating sheath 18c (e.g. extruded plastic sheath). The inner conductor 18b, for example, can be a solid wire conductor or a multi strand metal wire conductor comprising bundle of wires 18d.

The inner wire can be made of copper or aluminum. The flexible outer sleeve portion 120 can be applied (e.g. molded or installed or assembled) onto and surrounding the outer insulating sheath 18c of the positive cable 18.

The battery connector device 100 further comprises a negative terminal conductor bar 130 connected (e.g. soldered, welded, or sonically welded) at an opposite end of the battery 112 to the negative terminal tab (i.e. contact) of the battery 112. The negative terminal conductor bar 130 can extend along the opposite end of the battery 112.

The other end of the negative terminal conductor bar 130 is provided with a negative terminal conductor bar connector portion 132, as shown in FIGS. 5 and 6.

The negative terminal conductor bar 130 can be configured to wrap around one of the corners of the rectangular-shaped battery 112 (e.g. L-shaped). The L-shaped negative terminal conductor bar 130 can extend along an end of the battery 112 and along at least a portion of the side of the battery 112, as shown in FIGS. 5 and 6.

The negative terminal conductor bar 130 can also be mechanically coupled and/or adhered to the outer surface of the battery casing 112a to provide additional support and stability thereof (e.g. to survive mechanical shock when drop testing the battery jump starting device 10). For example, the negative terminal conductor bar 130 can be mechanically connected to the battery casing 112a by adhesive (e.g. silicon adhesive), double sided tape, double sided foam tape, insulating plastic or ceramic connector with snap fit connection and/or adhesive connection, and/or the battery casing 112 can be formed (e.g. molded) to mechanically connect (e.g. snap fit or interference connection) with the positive terminal conductor bar 114.

The battery connector device 100 further comprises a smart switch battery interface 134. The smart switch battery interface 134 comprises a relay printed circuit board (PCB) 136 having a first circuit board conductor bar 138 spaced apart from a second circuit board conductor bar 140 located on one side of the relay printed circuit board 136, as shown in FIGS. 5 and 6.

Figure 7:
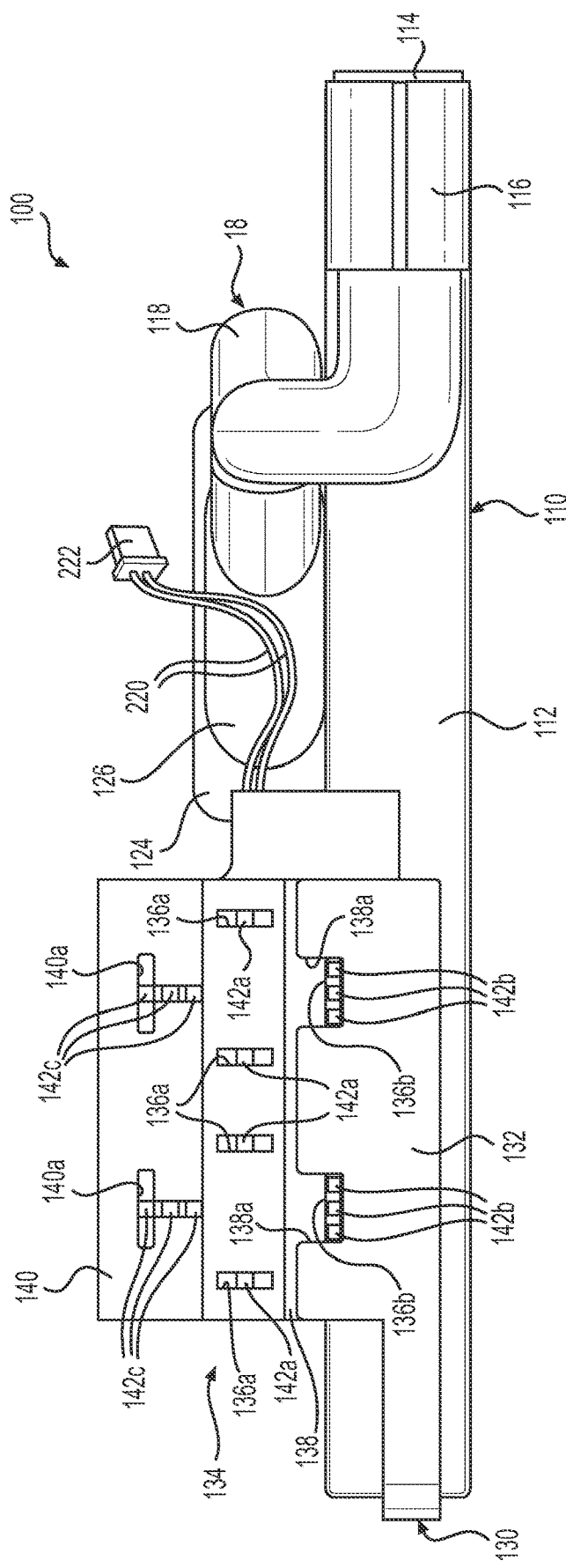
FIG. 7 is a side elevational view of the battery connector device shown in FIG. 5.
Figure 8:
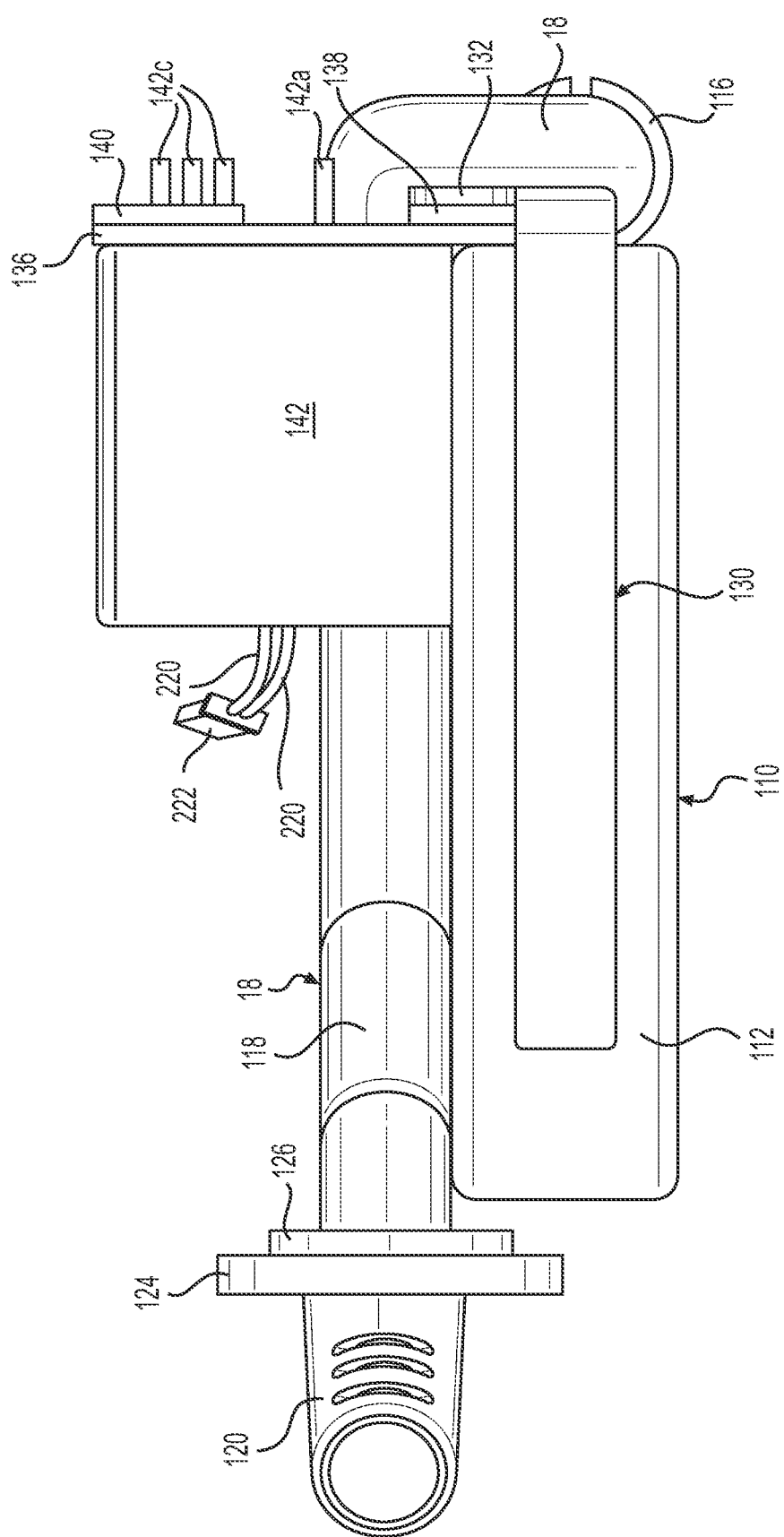
FIG. 8 is an end elevational view of the battery connector device shown in FIG. 5.

A pair of relays 142 are mounted on an opposite side of the relay printed circuit board 136. The relays 142 include relay anchoring pins 142a located in through holes 136a in the relay printed circuit board 136 (FIGS. 5 and 7). The relays 142 further comprise relay connector pins 142b extending through the through holes 136b provided in the relay printed circuit board 136 and through holes 138a provided in the first circuit board conductor bar 138. The relays 142 even further comprise relay connector pins 142c located in the through holes 136c provided in the relay printed circuit board 136 and through holes 140a provided in the second circuit board conductor bar 140. The relay anchoring pins 136a are soldered in place to mechanically connect the relays 142 to the relay printed circuit board 136. The relay connector pins 142b and 142c are soldered in place to mechanically and electrically connect the relays 142, respectively, to the first and second circuit board conductor bars 138, 140.

The through holes 136a in the relay printed circuit board 136 are rectangular-shaped (FIGS. 5 and 7) and accommodate the relay anchoring pins 142a. Specifically, a base portion of the relay anchoring pins 142a are rectangular-shaped with square-shaped ends. The square-shaped ends are dimensionally less wide verses the base portions creating transverse edges oriented flush with the outer surface of the relay printed circuit board 136. When solder is applied to the exposed ends of the relay anchoring pins 142a, the solder connects to the sides of the square-shaped ends and transverse edges to anchor and lock the relay anchoring pins 142a to the relay printed circuit board 136.

The slots 132a provided in negative terminal conductor bar connector portion 132 are rectangular-shaped and the through holes 138a in the first circuit board conductor bar 138 (FIG. 5) are T-shaped to accommodate the three (3) horizontally oriented relay connector pins 142b, as shown in FIG. 5. The ends of the relay connector pins 142b are shown flush with the outer surface of the negative terminal conductor bar connector portion 132. When solder is applied to the exposed ends of the relay connector pins 142b, the solder fills in the slots 132a in the negative terminal conductor bar connector portion 132 and the through holes 138a of the first circuit board conductor bar 138, and connects the sides of the connector pins 142b with inner edges of the slots 132a and through holes 138a to anchoring the relays 142 to the relay printed circuit board 136 and negative terminal conductor bar connector portion 132. This applied solder also electrically connects the negative terminal conductor bar connector portion 132 to the first circuit board conductor bar 138.

The through holes 140a provided in the second circuit board conductor bar 140 are T-shaped to accommodate the three (3) vertically oriented relay connecting pins 142c, as shown in FIG. 5. The relay connector prongs 140a extend outwardly from the outer surface of the relay printed circuit board 136 to connect with the exposed conductor end 144a of the negative cable 144, and shown in FIG. 7. When solder is applied to the exposed conductor end 144a and the ends of the relay connector prongs 140a the solder fills in the T-shaped slot and electrically connects the relay connector prongs 140a, second circuit board conductor bar 140, and exposed conductor end 144a of the negative cable 144.

Figure 9:
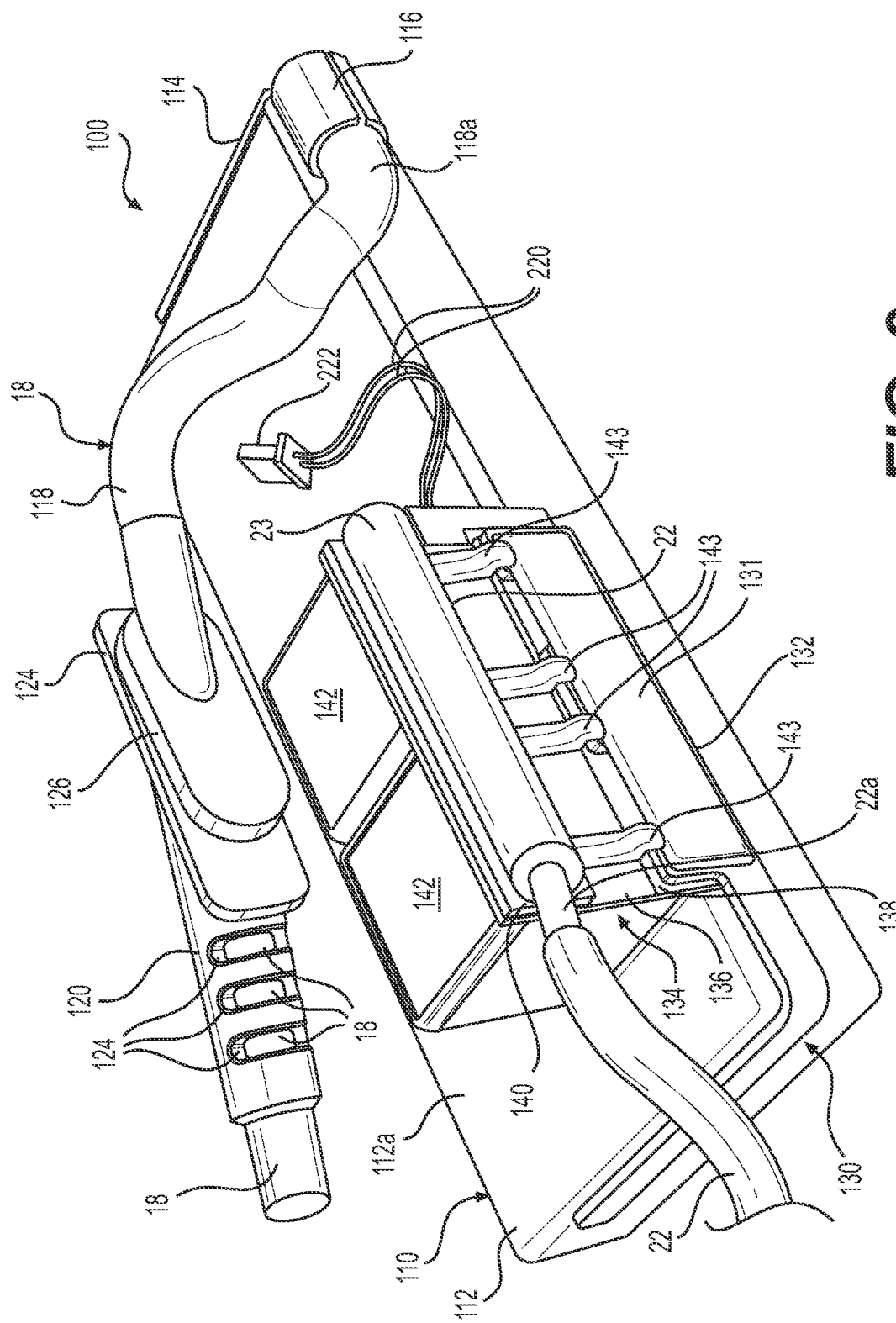
FIG. 9 is a perspective view of the battery connector device shown in FIG. 5, however, with the negative cable connected to the battery connector device.

The negative terminal conductor bar connector portion 132 of the negative terminal conductor bar 130 is connected (e.g. by soldering) to the first circuit board conductor bar 138 of the relay printed circuit board 136. The exposed conductor end 22a (i.e. with the insulating sheath removed) of the negative cable 22 is connected (e.g. by soldering) to the second circuit board conductor bar 140, as shown in FIG. 9.

Figure 10:
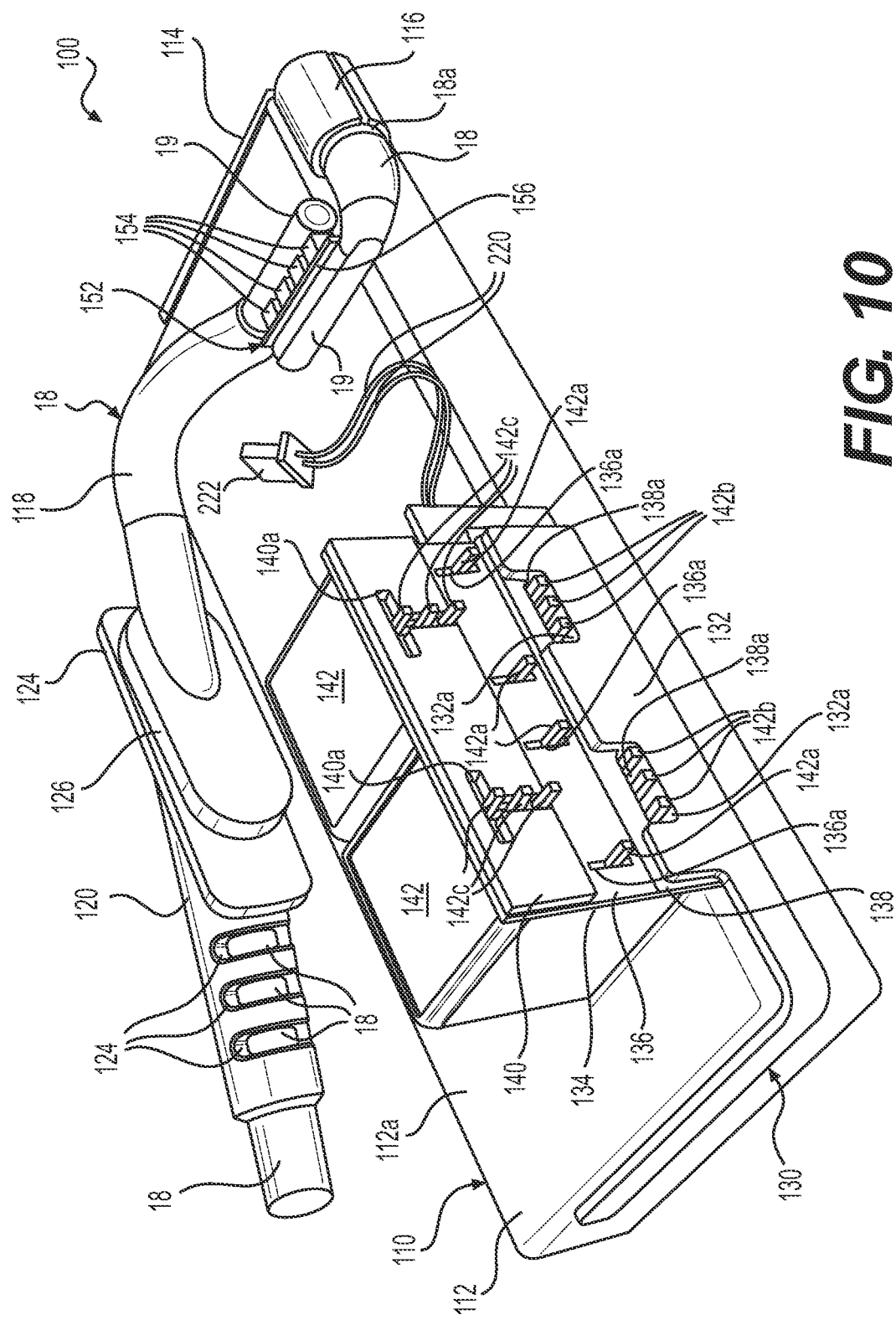
FIG. 10 is a view perspective view of the battery connector device shown in FIG. 5, however, with a diode connector installed on the positive cable.

The battery connector device 100 can be modified by providing the positive cable 18 with a diode connection 150, as shown in FIG. 10. For example, a diode connection is installed (e.g. spliced) into the positive cable 18. The diode connection 150 comprises a diode printed circuit board (PCB) 152 provided with a set of back-charge diodes 154 (e.g. Schottky Diodes) located on one side thereof, and a conductor bar 156 provided on an opposite side of the diode printed circuit board 152.

Assembly

Figure 11:
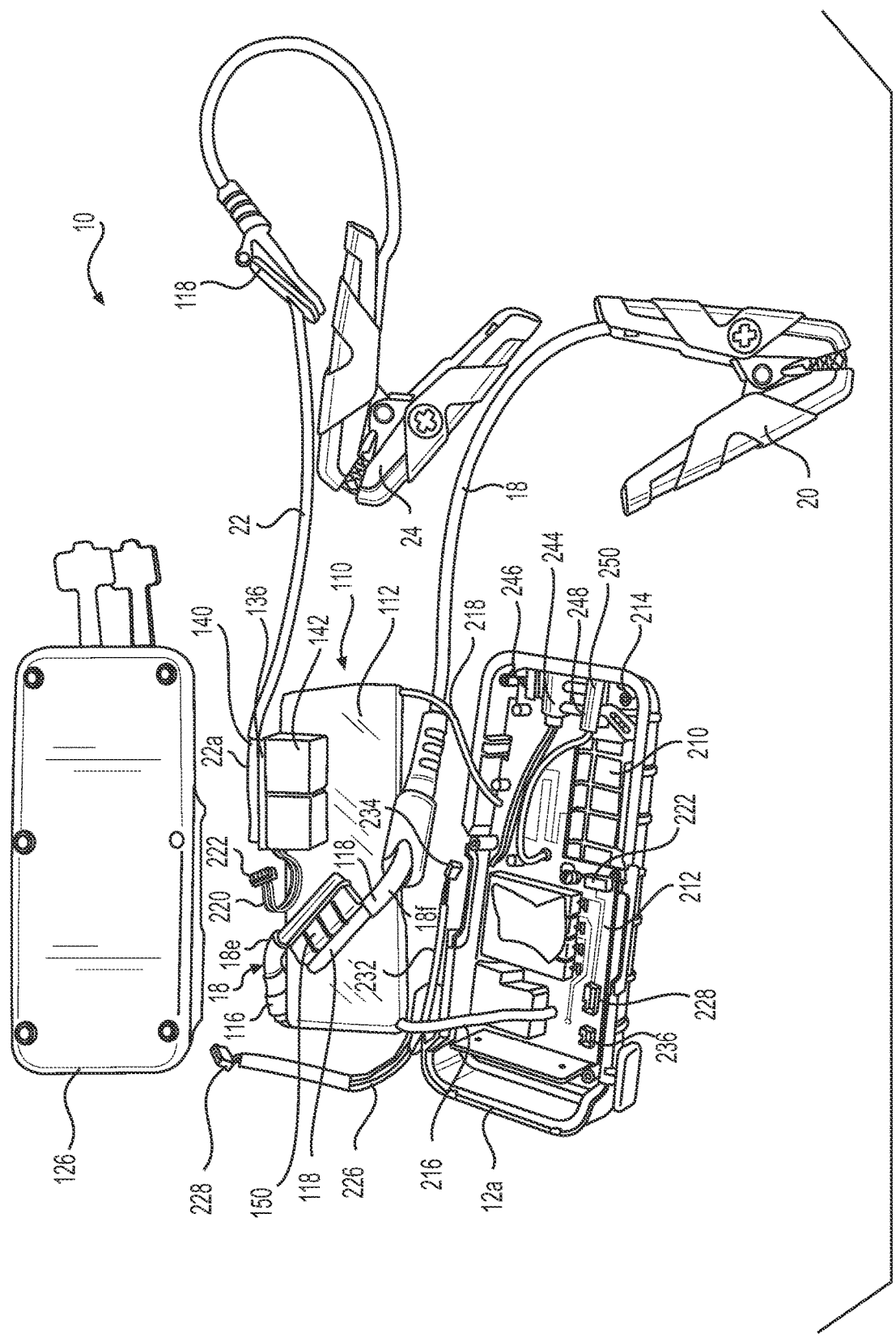
FIG. 11 is a perspective view of the battery connector device connected to other components or parts of the battery jump starting device.

The battery jump starting device 10 comprises the casing 12 having an upper casing portion 12a and a lower casing portion 12b, as shown in FIG. 11. The upper casing portion 12a and the lower casing portion 12b are configured to be connected together when assembling the battery jump starting device 10.

The battery jump starting device 10 further comprises the battery connection device 100 and controller assembly 210 both disposed within the casing 12. The controller assembly 210 comprises a circuit board 212 located adjacent to another circuit board 214.

Figure 12:
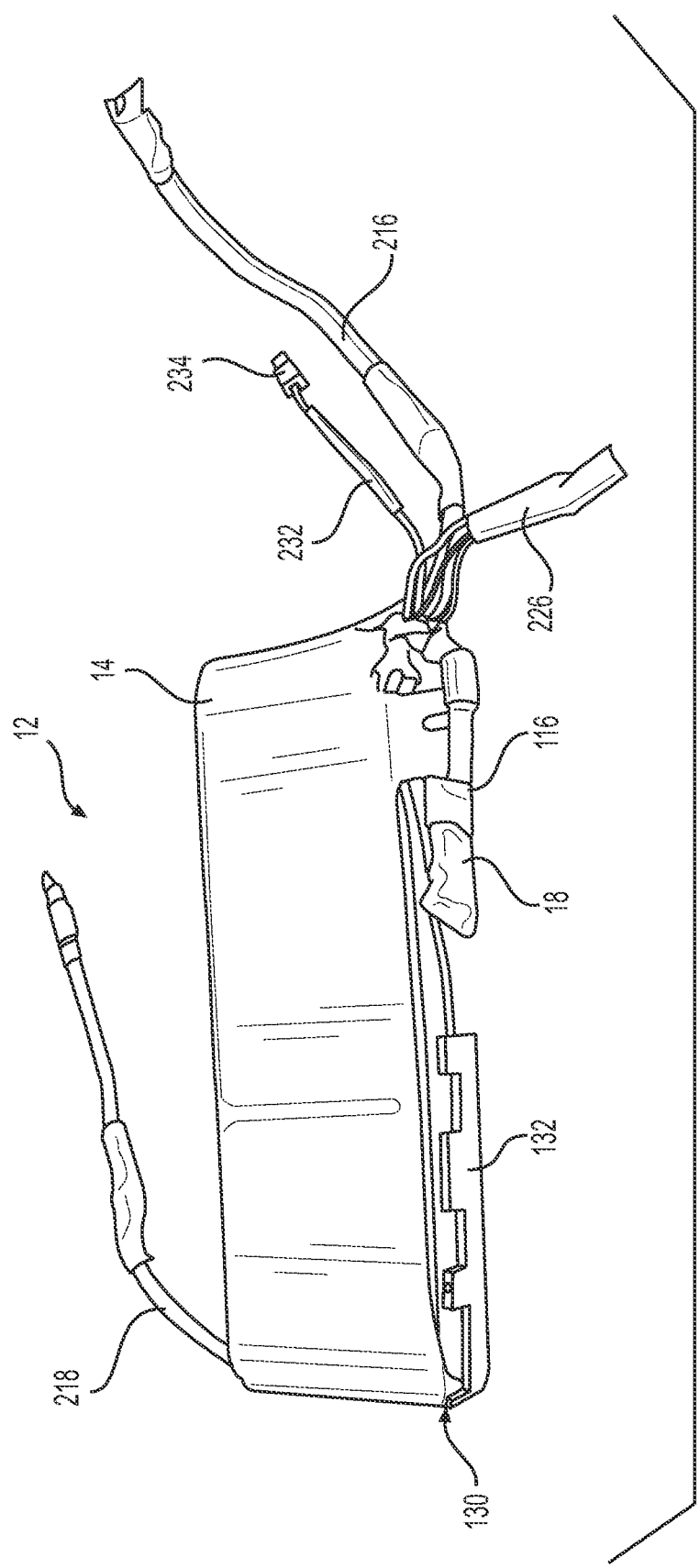
FIG. 12 is a perspective view of the battery assembly of the battery connector device shown in FIG. 5.

The positive terminal of the battery assembly 110 (FIG. 12) is connected to the circuit board 212 via a positive power wire 216. For example, the positive power wire 216 is soldered to the positive terminal conductor bar 114 (FIG. 5).

The negative terminal of the battery assembly 110 is connected to the circuit board 214 via a negative power wire 218.

The relay printed circuit board 136 is provided with a wire set 220 having a connector 222. The connector 222 is configured to connect with the relay board connector 224 located on the circuit board 212 of the controller assembly 210 during assembly of the battery jump starting device 10.

The battery assembly 110 further comprises a wire set 226 having a connector 228. The connector 228 is configured to connect with the battery cell charging/monitoring connector 230 located on the circuit board 212 of the controller assembly.

The battery assembly 110 also comprises a battery temperature sensor having a wire set 232 having a connector 234. The connector 234 is configured to connect with the temperature sensor connector 236 located on the circuit board 212 of the controller assembly.

The circuit board 212 is provided with in charge power resistors 240 and an out relay 242, as shown in FIG. 11. Further, the lower casing portion 12b is provided with a main user out connector 244 having a wire set 246 connected to the circuit board 214, and a main user in connector 248 having a wire set 250 connected to the circuit board 214.

The battery assembly 110 is connected to battery jump starting device 10, as shown in FIG. 11. The battery connector device 110 is installed within the casing 12 of the battery jump starting device 10 when assembled.

Enhanced Conductivity

An enhanced conductivity battery connector device 400 is shown in FIGS. 13-25. The enhanced conductivity battery connector device 400 provides a significantly increased conductivity compared to the battery connector device 100, as shown in FIGS. 5-10.

The amount of power to be conducted from the battery 412 to the clamps can be enhanced as follows:
1) Increase Wire Gauge
   e.g. change 4AWG (American Wire Gage) positive cable 18 and negative cable 22 (FIG. 9) to a 2AWG positive cable 318 and negative cable 322 (FIGS. 13 and 15).
2) Increase Conductivity of Negative Cable Connection
   e.g. negative cable end 322a (FIG. 15) connection to the relays will extend all the way across the connector pins 422c of the relays 422.
3) Increase Conductivity of Positive Cable Connection
   e.g. the positive extension tab 414 is lengthened so that the positive cable 318 can be rolled up (FIGS. 17-22) in the positive extension tab 414 and soldered together thoroughly;
4) Increase Conductivity of Diode Connection
   e.g. replace the diode connection 150 (FIG. 5) with the diode connection 450 (FIG. 23).
5) Redesign Resistor/Diode Printed Circuit Board (PCB)
   e.g. replace the diode printed circuit board (PCB) 152 (FIG. 10) with the diode printed circuit board (PCB) 452 (FIG. 23).
6) Reconnect Resistors
   e.g. reconnect resistors R134A&B, R135A&B located on the diode printed circuit board (PCB) 152 (FIG. 10) to be connected again.

Figure 13:
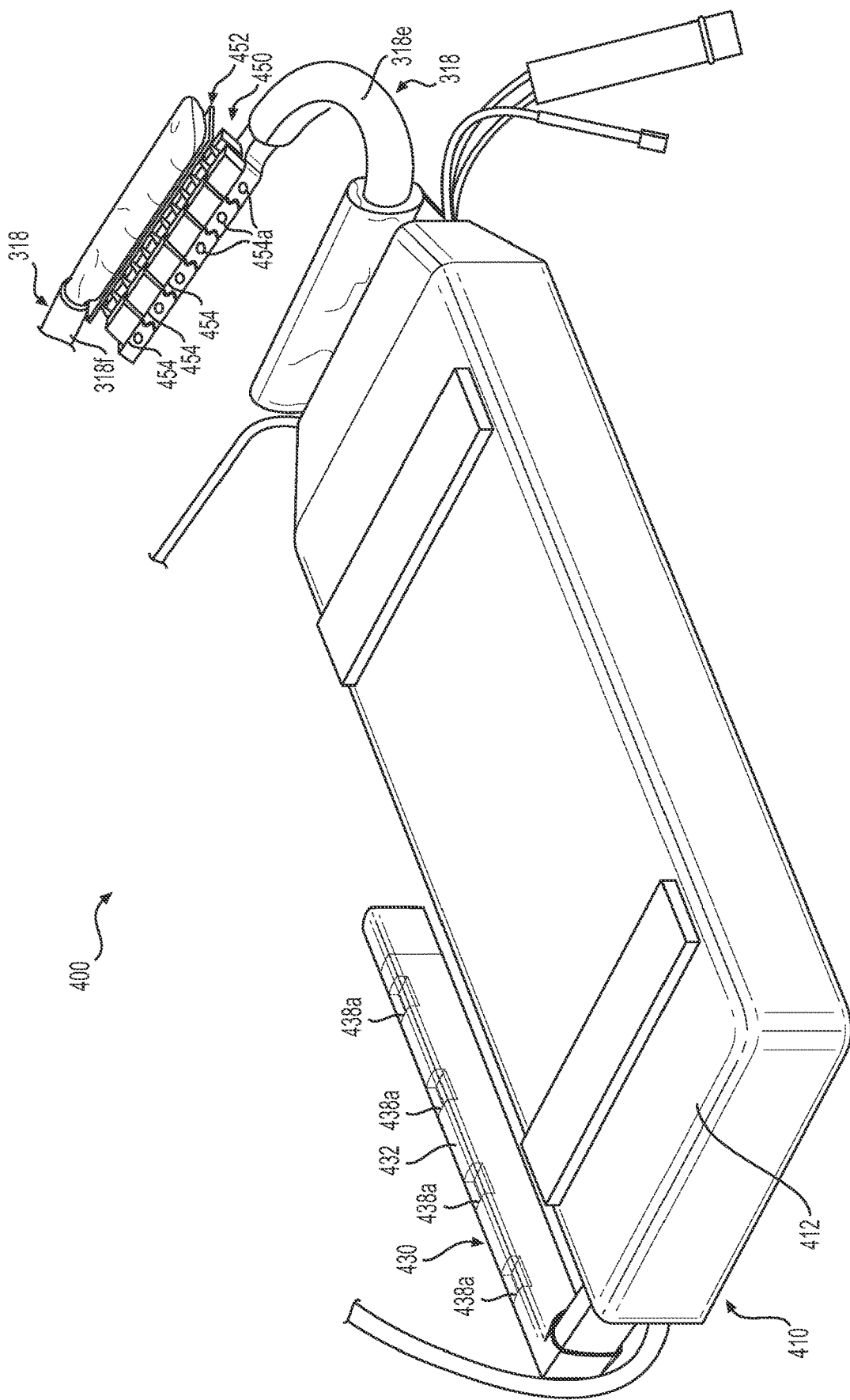
FIG. 13 is a front perspective view of another battery connector device for the battery jump starting device.
Figure 15:
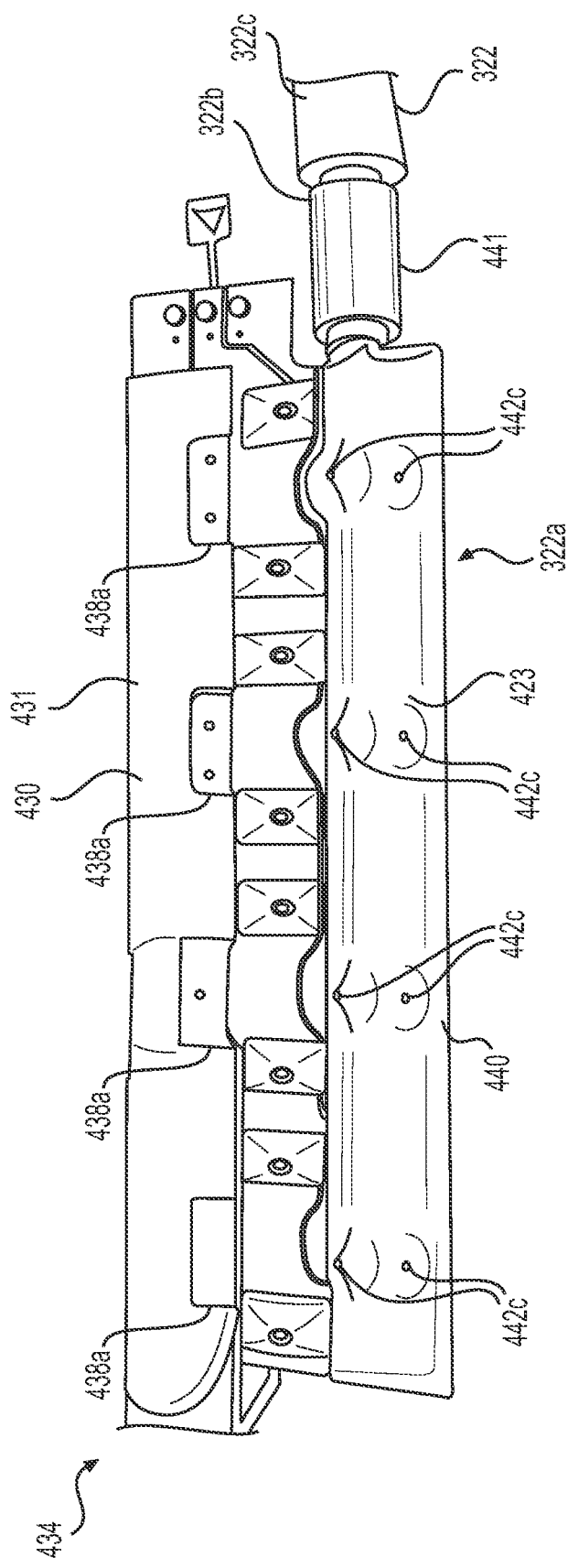
FIG. 15 is a detailed view of the positive cable connection with the relay printed circuit board after being soldered thereto.
Figure 16:
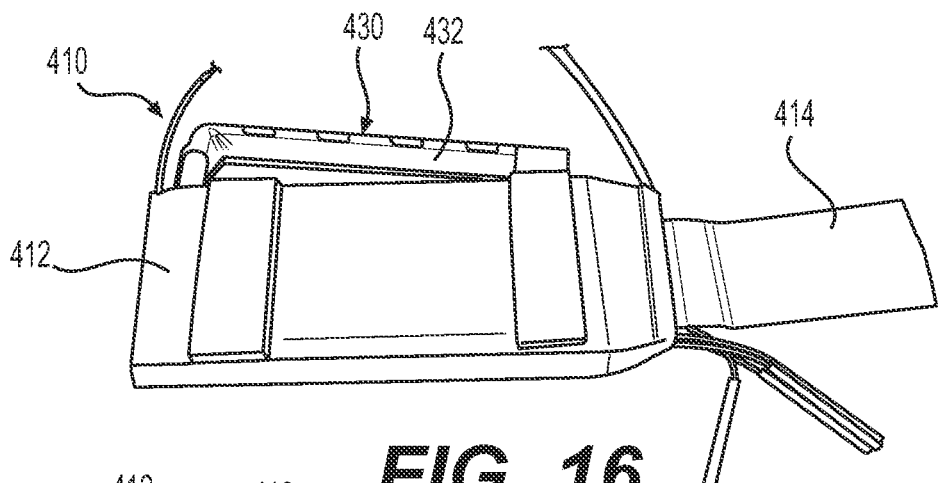
FIG. 16 is a front perspective view of the battery assembly of the battery connector device shown in FIG. 13.
Figure 17:
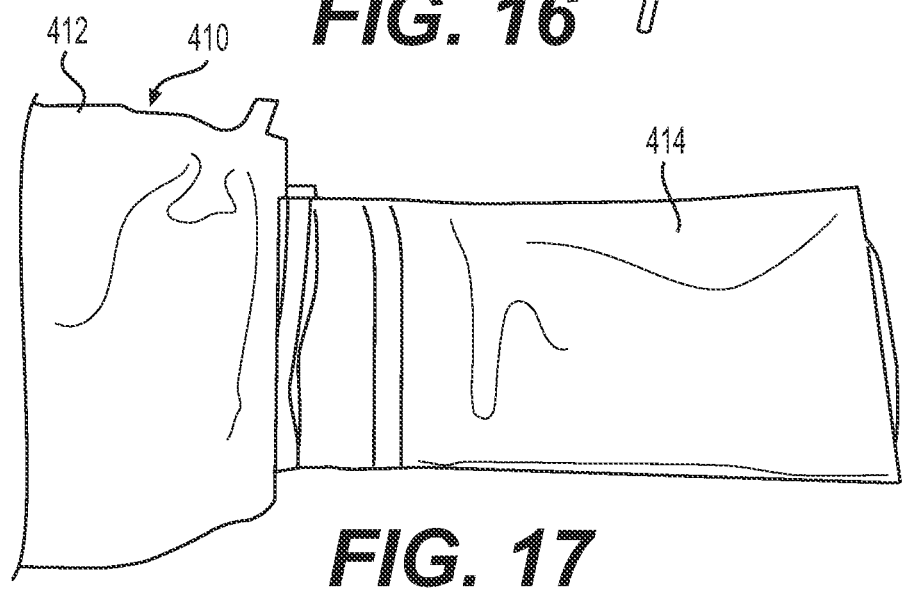
FIG. 17 is a partial top planar view of the battery assembly shown in FIG. 16, however, with the positive terminal conductor sheet in an unwound condition.
Figure 18:
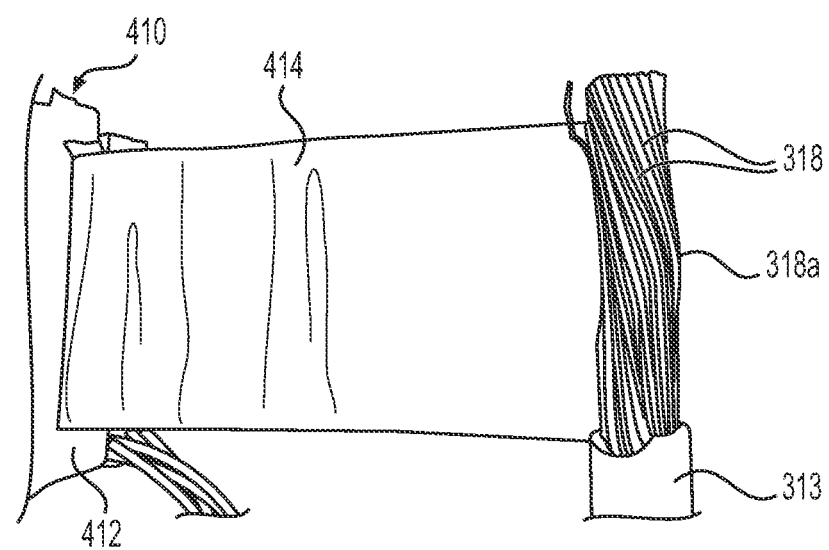
FIG. 18 is a partial top planer view of the positive terminal conductor of the battery assembly shown in FIG. 16.
Figure 19:
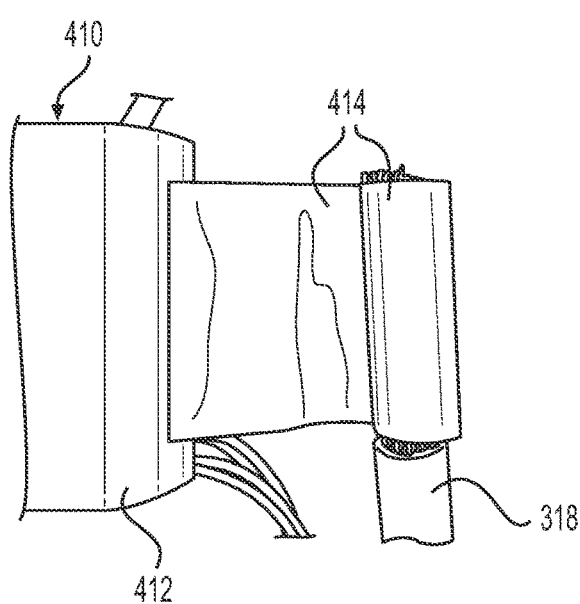
FIG. 19 is an end perspective view of the positive terminal conductor partially wound around the end of the positive cable.
Figure 20:
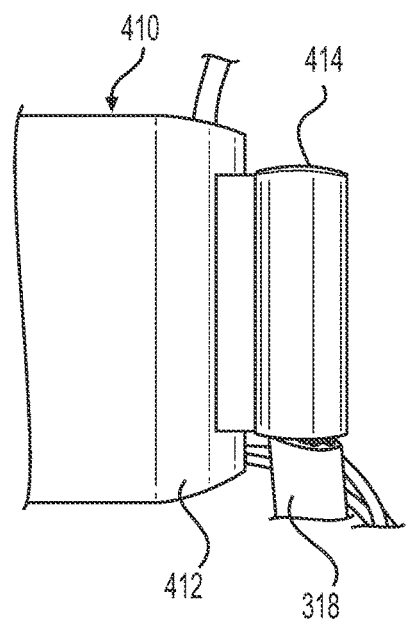
FIG. 20 is an end perspective view of the positive terminal conductor fully wound around the end of the positive cable.
Figure 21:
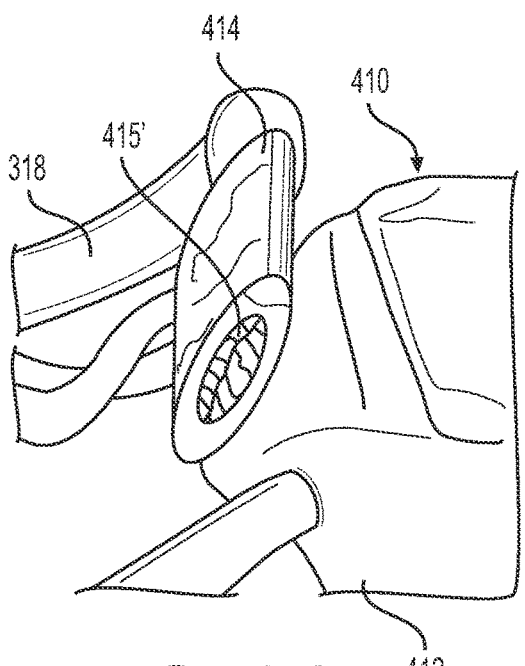
FIG. 21 is a side perspective view of the positive terminal conductor fully wound around and soldered to the end of the positive cable.
Figure 22:
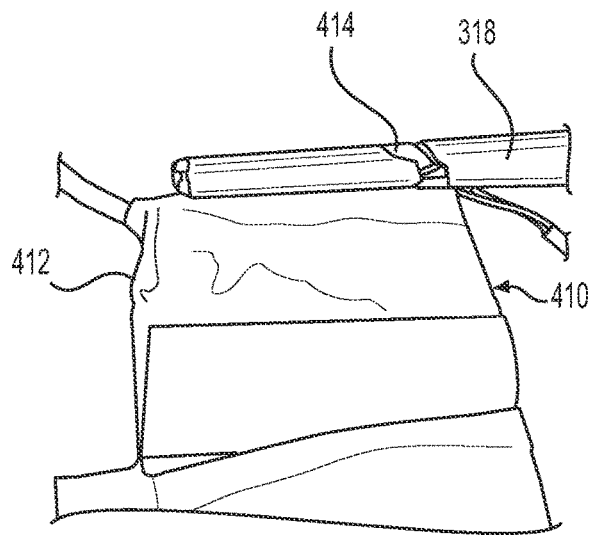
FIG. 22 is an opposite end perspective view of the positive terminal conductor fully wound around and soldered to the end of the positive cable.

A detailed description of each of these enhanced conductivity features or arrangement is set forth below
1) Increase Wire Gauge
   The gauge of the positive cable 18 and negative cable 22 (FIG. 9), for example, can be increased from 4AWG (American Wire Gage) cable to a 2AWG cable for positive cable 318 and negative cable 322 (FIGS. 13 and 15). The comparative specifications of the 4AWG cable and 2AWG cable are as follows:

|  | 2AWG | 4AWG |
|---|---|---|
| Diameter | 02576 in | 02294 in |
|  | (6.544 mm) | (5.189 mm) |
| Turns of wire | 3 88/in | 4 89/in |
|  | (1.53/cm) | (1.93/cm) |
| Area | 66.4 kcmil | 41.7 kcmil |
|  | (33.6 mm$^2$) | (21.2 mm$^2$) |
| Resistance/length | 0.5127 mΩ/m | 0.8152 mΩ/m |
|  | (0.1563 mΩ/ft) | (0.2485 mΩ/m) |
| Ampacity | 95 (60° C.) | 70 (60° C.) |
|  | 115 (75° C.) | 85 (75° C.) |
|  | 130 (90° C.) | 95 (90° C.) |
| Fusing current | 1.3 kA (10 s) | 946 A (10 s) |
|  | 10.2 kA (1 s) | 6.4 kA (1 s) |
|  | 57 kA (32 ms) | 36 kA (32 ms) |

The 2AWG cable provides a significant increase of conductivity (i.e. ampacity) compared to the 4AWG cable (i.e. approximately 36%).

2) Increase Conductivity of Negative Cable Connection

Figure 14:
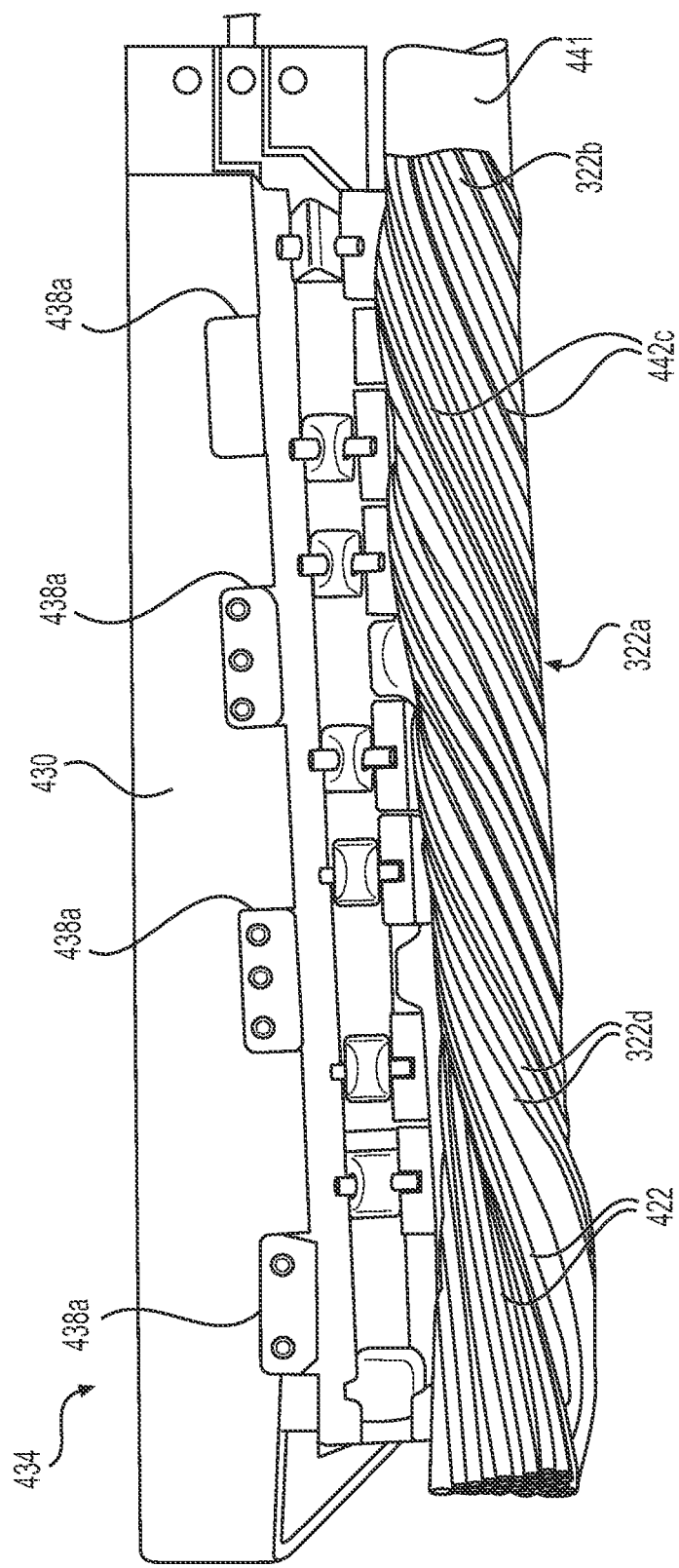
FIG. 14 is a detailed view of the positive cable connection with the relay printed circuit board prior to being soldered thereto.

The negative cable 322 (FIG. 15) can be connected to the battery 412 (FIG. 13) in a manner to increase the conductivity (i.e. ampacity) between the battery 412 and negative cable 322. For example, the negative cable end 322a can be directly connected (e.g. soldered) to the connector pins 442c (FIG. 15) of the relays 442. Specifically, the negative cable end 322a can extend across and directly connect to all relays 342 of the smart switch battery interface 434, as shown in FIGS. 14 and 15. Further, the negative cable end 322a can be connected to a conductor loop 441 of the circuit board conductor bar 440.

The negative cable 322, for example, can be stranded wire comprising an inner electrical wire conductor 322b composed of an untwisted or twisted bundle of wires 322d disposed within an outer electrical insulating sheath 322c. The electrical insulating sheath 322c of the negative cable 322 can be removed from the negative cable end 322a exposing the inner electrical conductor 322b at the negative cable end 322a.

The exposed bundle of wires 322d of the electrical conductor 322b can be forced over the ends of the exposed connector pins 442c of the relays 442 so that strands of the bundle of wires 322d are captured between the adjacent connector pins 442c. The exposed bundles of wires 332d can be further forced into contact with the circuit board conductor bar 440 (e g. made of copper). Solder 423 is applied to this assembly so that the solder flows between the exposed bundles of wires 422d to the connector pins 442c and the circuit board conductor bar 440 to complete the electrical connection between the negative cable 322 and the smart switch battery interface 434 connected to the battery 412.

The length of the exposed bundle of wires 322d is selected so that exposed bundle of wires 322d directly connects with each set of connector pins 442c of each and every relay 442 to provide the maximum electrical conductivity (i.e. maximum ampacity) between the negative cable 322 and the battery 412.

3) Increase Conductivity of Positive Cable Connection

The positive cable 318 can be connected to the battery 412 in a manner to increase the conductivity (i.e. ampacity) between the battery 412 and positive cable 318. For example, the positive cable 318 can be rolled up in the positive extension tab 414 and soldered together thoroughly. The connection between the positive cable 318 and battery 412 is shown in FIGS. 16-22.

The positive cable 318, for example, can be stranded wire comprising an inner electrical wire conductor 318b composed of an untwisted or twisted bundle of wires 318d disposed within an outer electrical insulating sheath 318c. The electrical insulating sheath 318c of the positive cable 318 can be removed from the positive cable end 318a exposing the inner electrical conductor 318b at the positive cable end 318a.

The battery 412 is provided with a positive extension tab 414. The positive extension tab 414 is a metal sheet (e.g. copper sheet) connected to the positive terminal tab of the battery 412.

The exposed bundle of wires 318d of the inner electrical conductor 318b can be soldered with tin, and then rolled up within the positive extension tab 414. Solder 415 (FIG. 21) is applied to the exposed bundle of wires 318d and the positive extension tab 414.

The length of the exposed bundle of wires 318d is selected so that exposed bundle of wires 318d directly connects with the full width of the positive extension tab 414 to provide the maximum electrical conductivity (i.e. maximum ampacity) between the battery 312 and the positive cable 318.

4) Increase Conductivity of Diode Connection

Figure 23:
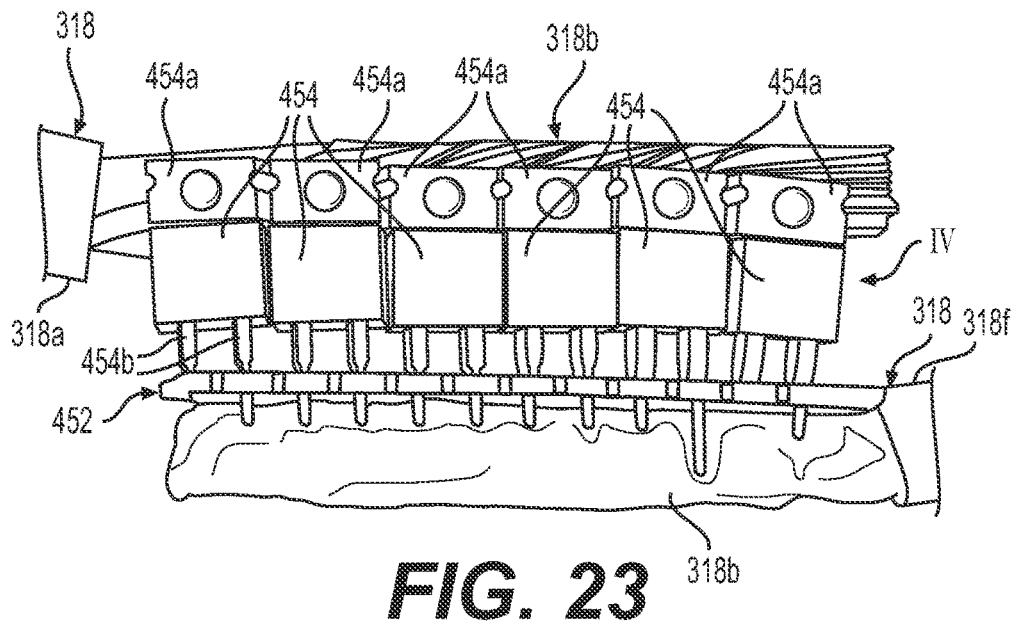
FIG. 23 is a perspective view of the diode connector between sections of the positive cable.
Figure 24:
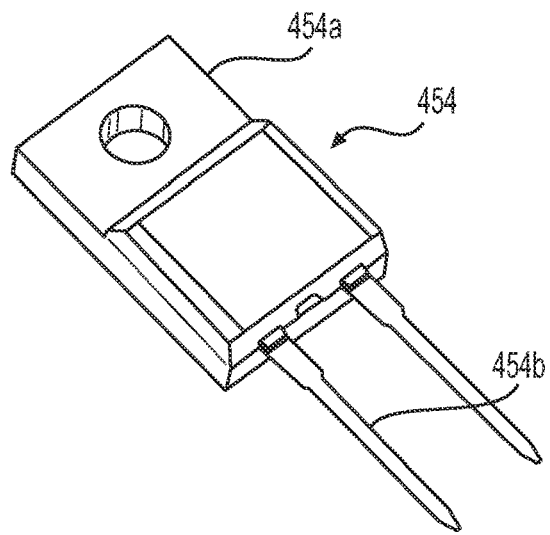
FIG. 24 is a perspective view of a Schottky Diode used in the diode connector.
Figure 25:
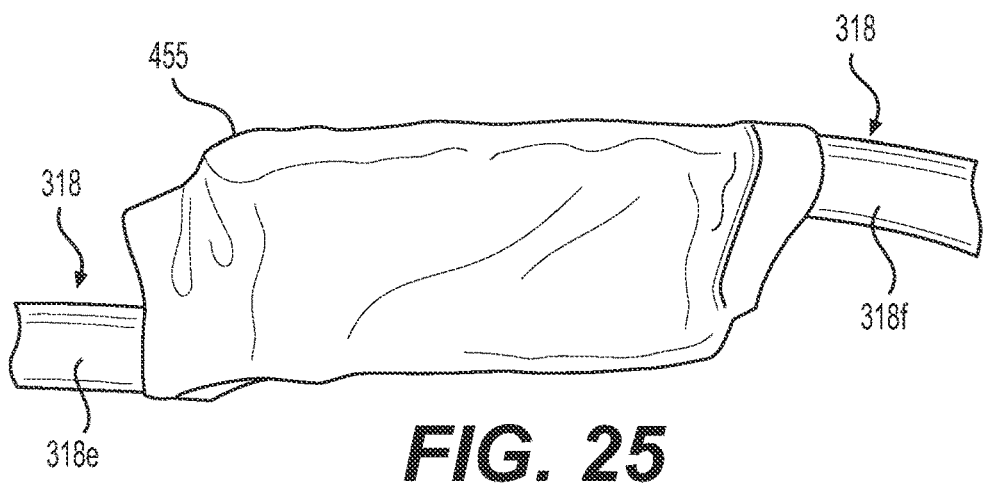
FIG. 25 is a perspective view of the diode connector insulated with a shrink wrap sleeve.

The positive cable 318 can be provided with a diode connection 450 configured to increase the conductivity along the positive cable 318, as shown in FIGS. 23-25.

The diode connection 450 comprises a plurality of diodes 454 connected between positive cable sections 318e and 318f (FIG. 25). For example, the diode connection 450 comprises six (6) back-charge type diodes (e.g. Schottky barrier diodes).

The diodes 454 are soldered between the positive cable sections 318e and 318f Specifically, the diode conductor tabs 454a are soldered to the positive cable section 318e and the diode conductor prongs 454b are soldered to the positive cable section 318f. More specifically, the diode conductor prongs 454b of the diodes 354 extend through the diode circuit board 452, extend into the bundle of wires 318b, and then are soldered in place completing assembly of the diode connection 450.

The diode connection 450 is then insulated, for example, using a shrink wrap insulator 455 (FIG. 25), which is applied around the diode connection 450, and then shrunk by applying heat (e.g. using heat gun).

5) Redesign Resistor/Diode Printed Circuit Board (PCB)
   e.g. redesign of resistor/diode PCB to eliminate the diodes extending therefrom;
6) Reconnect Resistors
   e.g. reconnect resistors R134A&B, R135A&B that are on the Resistor/Diode PCB to be connected again.

Test #1

Figure 26:
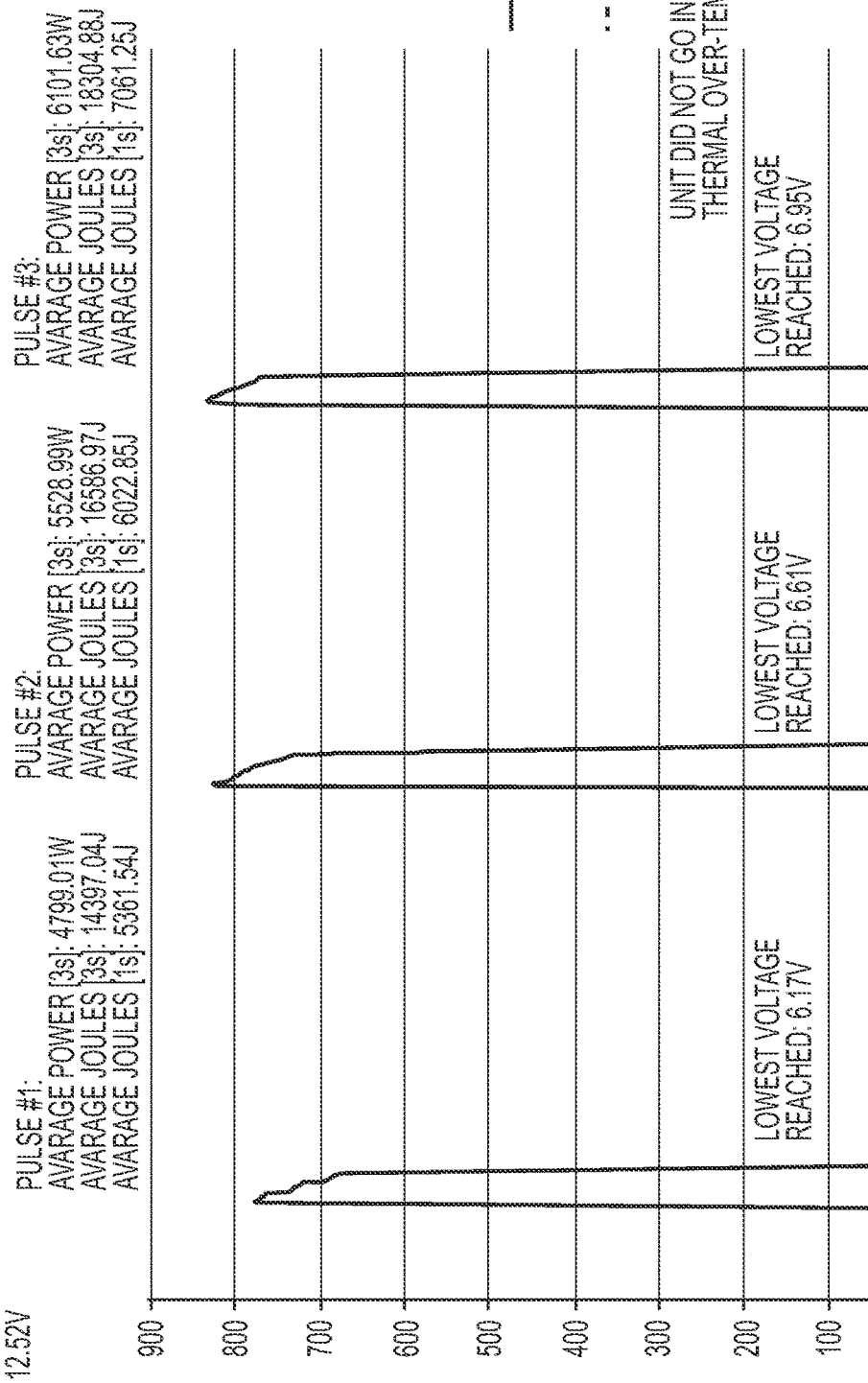
FIG. 26 is a graphical illustration showing a load test of the battery connection shown in FIGS. 5-10.

The battery connection device 100 shown in FIG. 5 was subjected to a 1250A Load Test. The results are shown in FIG. 26, and as follows:
   Pulse #1 Average Power of 4799.01 W
   Pulse #2 Average Power of 5528.99 W
   Pulse #3 Average Power of 6101.63 W Test #2

Figure 27:
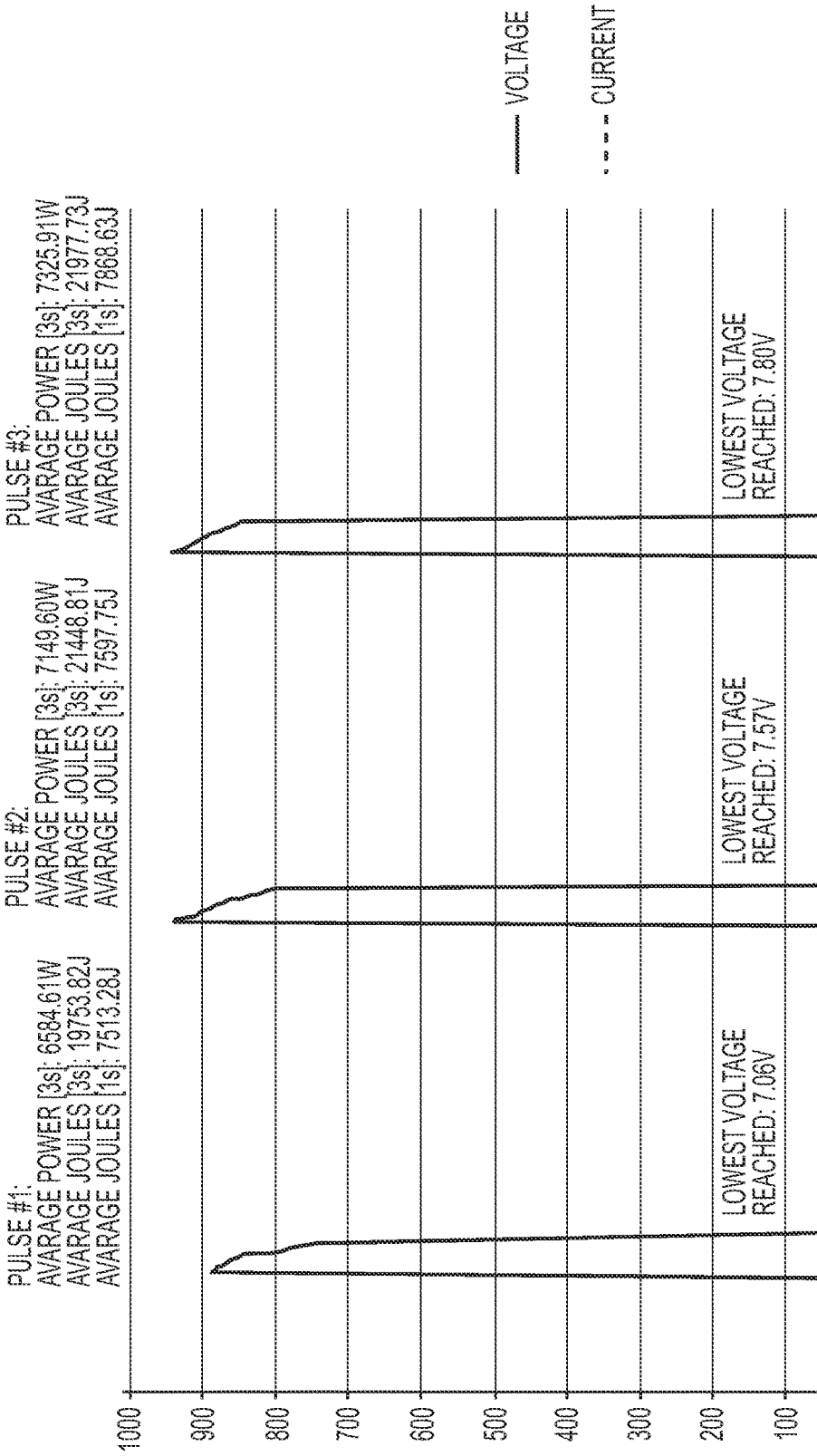
FIG. 27 is a graphical illustration showing a load test of the battery connection shown in FIGS. 13-25.
Figure 28:
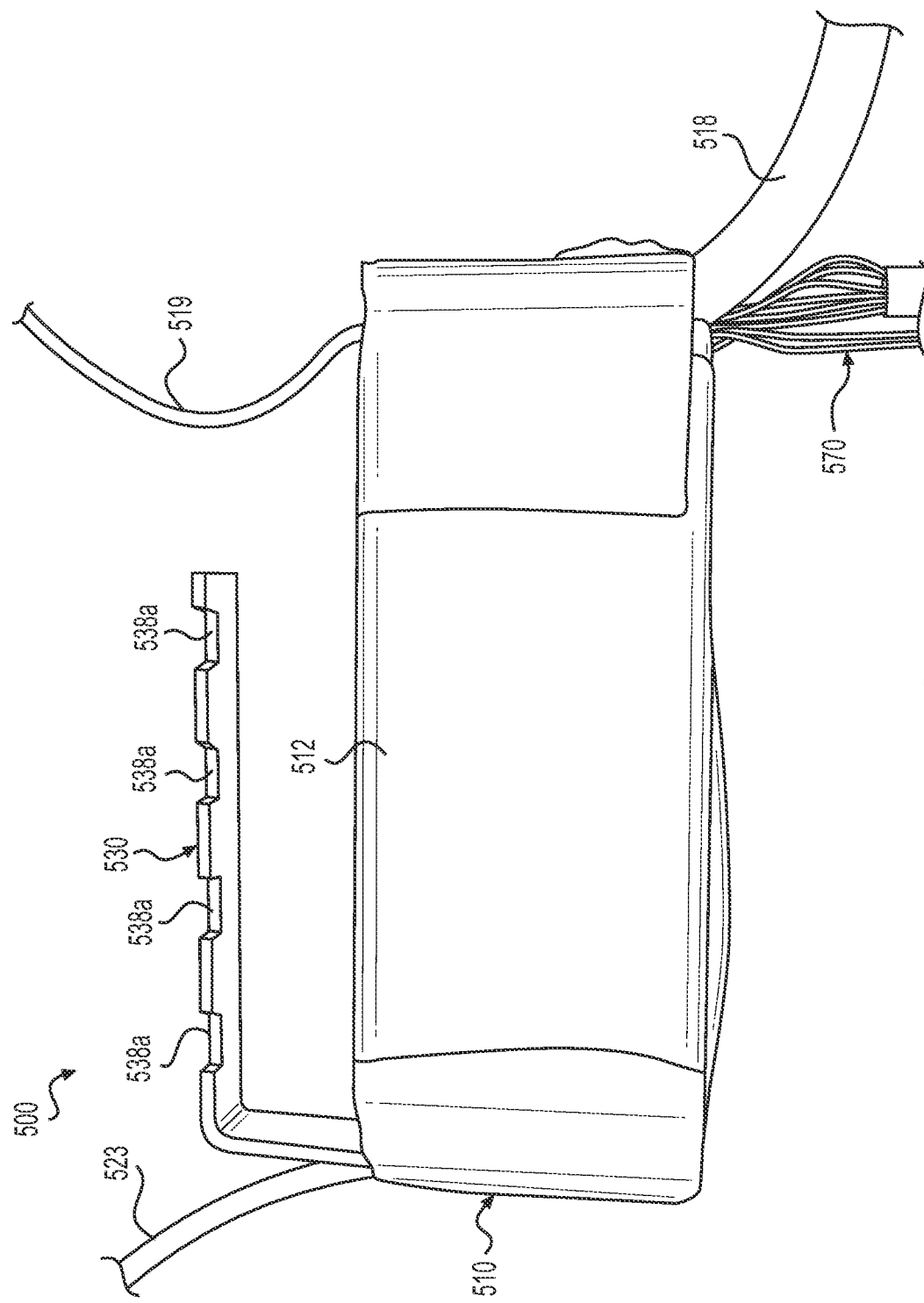
FIG. 28 is a front view of a further battery connector device for the battery jump starting device.

The battery connection device 400 shown in FIG. 13 was subjected to a 1250A Load Test. The results are shown in FIG. 27, and as follows:
   Pulse #1 Average Power of 6584.61 W
   Pulse #2 Average Power of 7149.60 W
   Pulse #3 Average Power of 7325 91 W This results in a significant increase of approximately twenty percent (20%) for peak power compared to the results of TEST #1.

Another enhanced conductivity battery conductor device 500 is shown in FIGS. 28-36. The enhanced conductivity battery connector device 500 provides a significantly increased conductivity compared to the battery connector device 100, as shown in FIGS. 5-10.

The enhanced conductivity battery conductor device 500 comprises the battery assembly 410, including the battery 512 connected to the positive cable 518 and the negative terminal conductor bar 530. A positive wire 519 is connected directly or indirectly to the positive terminal tab or positive cable 518 of the battery 512, and a negative wire 523 is connected directly or indirectly to the negative terminal tab or negative terminal conductor bar 530. The enhanced conductivity battery conductor device 500 can further include a bundle of wires 570 connected to or associated with the operation of the battery 512 (e.g. battery temperature sensor, power supply, etc.).

Figure 29:
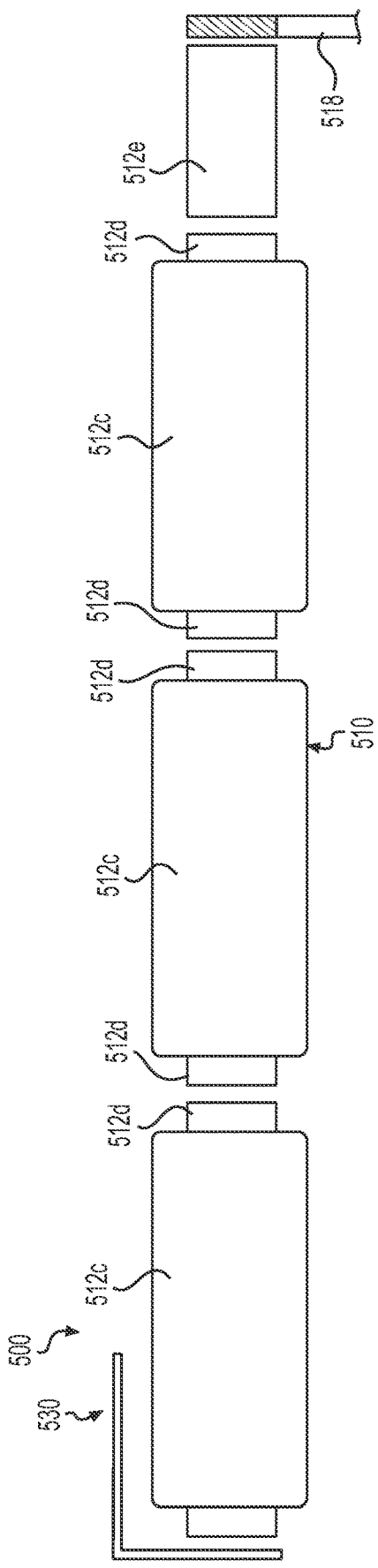
FIG. 29 is a front view of the battery connector device comprising a plurality of battery cells, separate tab, and conductors (e.g. plate conductors) prior to assembly.

The battery 512 can comprise a single battery cell 512c (FIG. 29), or multiple battery cells 512c connected end-to-end in series along an axis. Three (3) separate battery cells 512c are shown in FIG. 29. The exposed conductor end of the positive cable 518 (FIG. 29) is oriented transversely relative to a length of the battery cell arrangement and at least a portion of the negative terminal conductor bar 530 (FIG. 29) is oriented transversely relative to the length of the battery cell arrangement.

The battery cells 512c each have battery tabs 512d (i.e., positive and negative tab) located at opposite ends of each battery cell 512c. The battery cells 512c are connected together in series by welding (e.g. sonically and/or thermally welding) and/or soldering respective battery tabs 512d together. For example, the battery tabs 512d are positioned so as to overlap each other (e.g. edges overlapping opposite battery tab 512d, or edge-to-edge).

The battery tabs 512d are metal plates (e.g. relative thin metal foils) extending outwardly from the body and opposite edges of each battery cell 512c. As shown in FIG. 29, the battery tabs 512d extend along opposite edges at the width of each battery cell 512c. The battery tabs 512d are each centered and extend most of the width of each opposite edge of each battery cell 512c.

Figure 30:
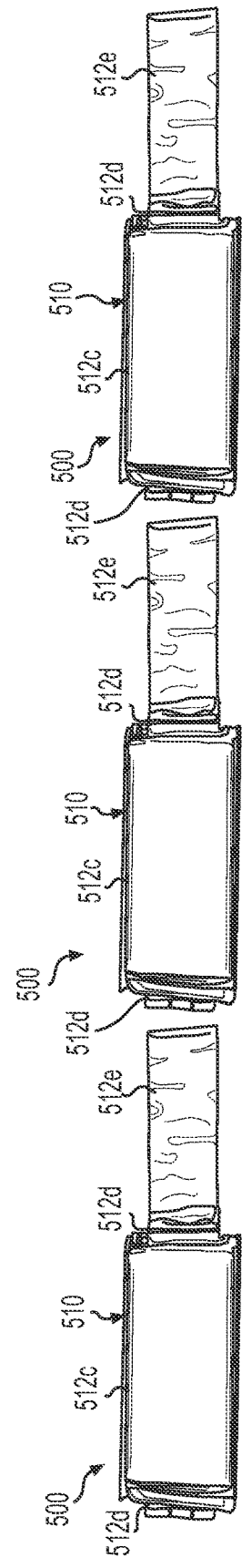
FIG. 30 is a front view of the battery connector device comprising battery cells being prepared with separate tabs for lengthening the tabs.
Figure 31:
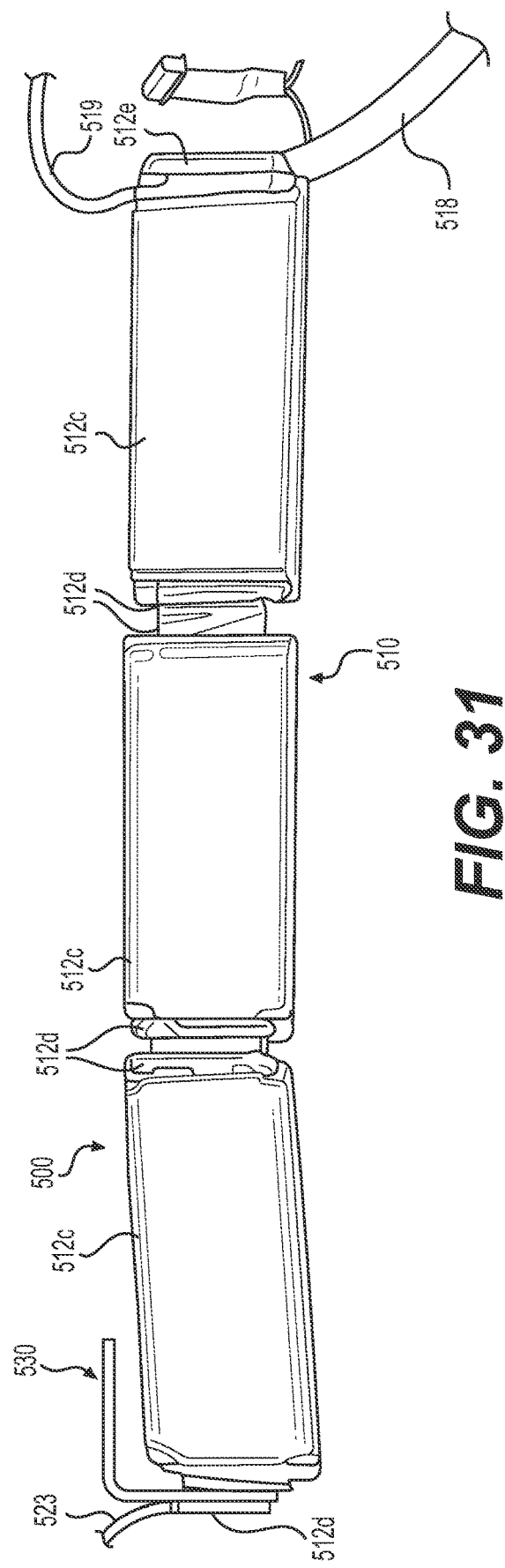
FIG. 31 is a front view of the battery connector device comprising the plurality of battery cells, separate tab, and conductors shown in FIG. 29, after assembly.
Figure 33:
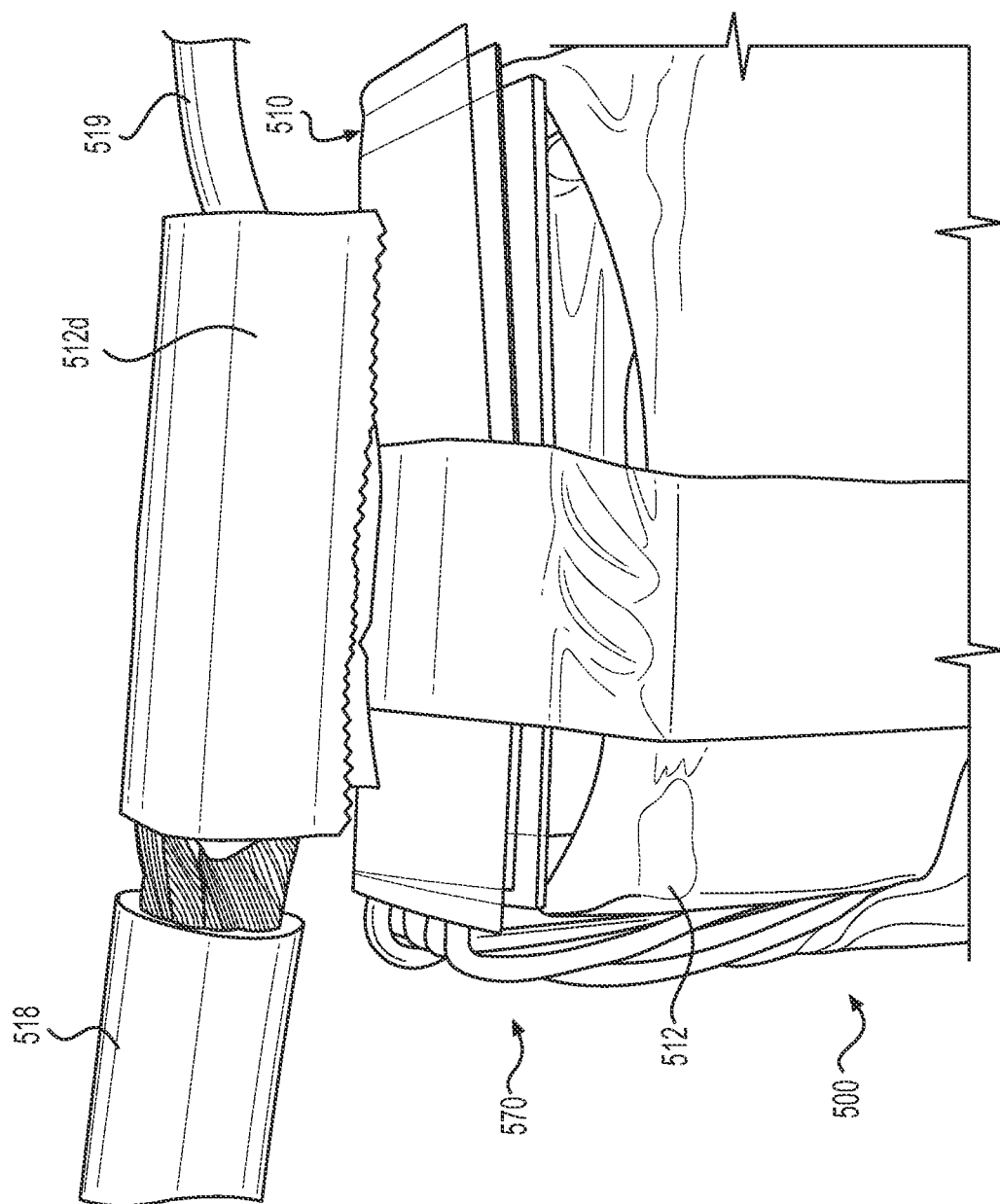
FIG. 33 is an end perspective view of the battery connector device showing the separate tab being wrapped or wound around an exposed end of the positive cable, and soldered together.

As shown in FIGS. 29 and 30, a separate tab 512e (i.e. a positive separate tab) is added or connected to the right side of the battery cell 512c to extend the length of the battery tab 512d. The separate tab 512e is shown as having the same width as the battery tab 512d; however, this width can be different. To assemble the separate tab 512e to the battery tab 512d, for example, the separate tab 512e is positioned to overlap over the battery tab 512d, and then welded (e.g. sonically and/or thermally welded) and/or soldered together. The exposed end of the positive cable 518 is then wound up inside the separate tab, as shown in FIGS. 31 and 33. For example, the initially flat separate tab 512e is wrapped around the exposed end of the positive cable 518, and then connected to the exposed end by welding (e.g. sonically and/or thermally welding) and/or soldering. For example, a layer of solder is applied to one or both sides of the separate tab 512e, and then after wrapping the separate tab 512e around the exposed end of the positive wire 518, the assembly is heated to melt the layered solder and solder the assembly together.

Figure 32:
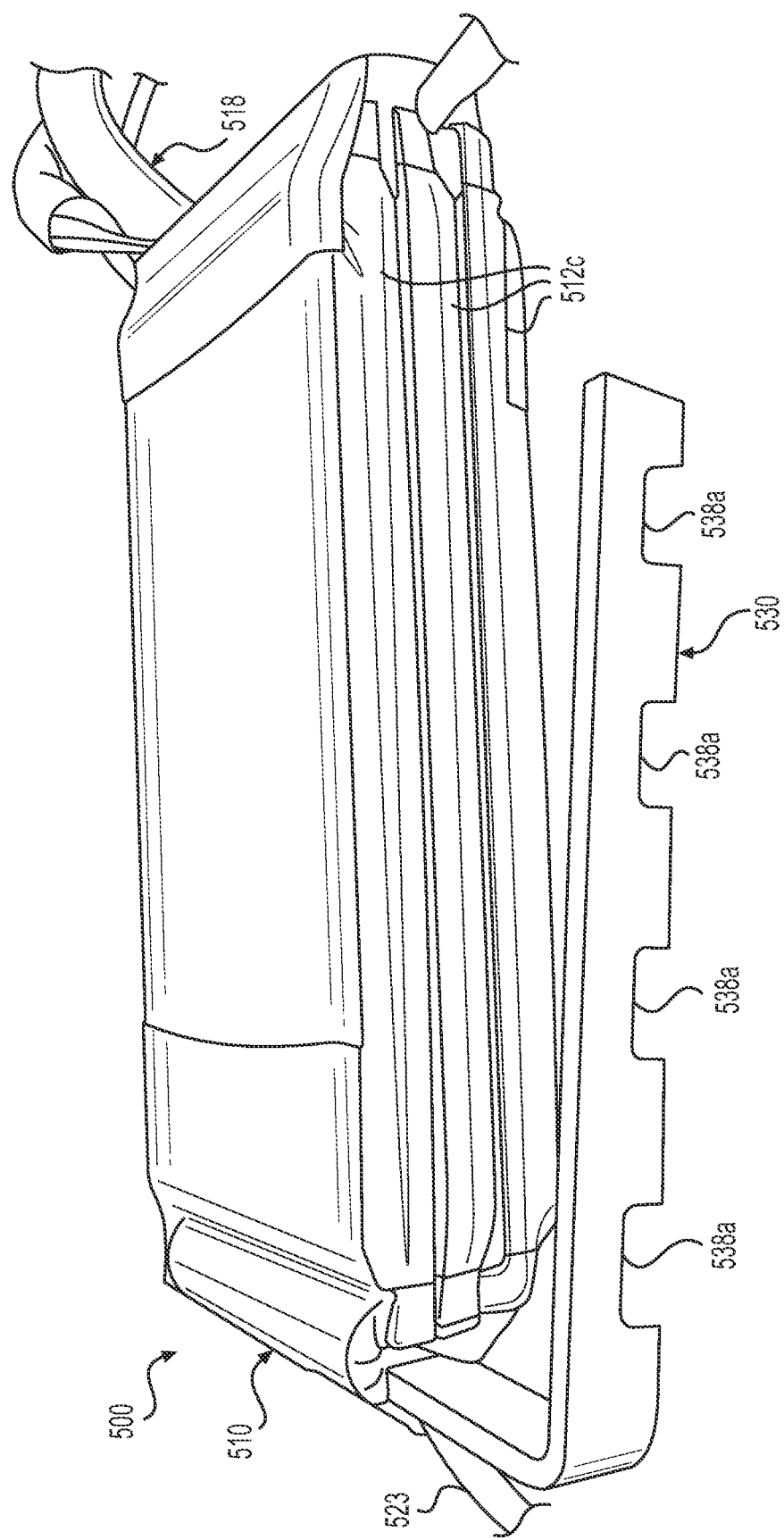
FIG. 32 is a perspective view showing the battery connector device comprising the battery cell assembly shown in FIG. 31, after folding the battery cells.

The three (3) battery cells 512c once connected together, as shown in FIG. 31, are then folded over each other into the layered battery cell arrangement shown in FIG. 32. The layered battery cell arrangement can be packaged (e.g. the three (3) battery cells can be taped or shrink wrapped together), or placed within a battery cover or casing, as shown in FIG. 33.

Figure 34:
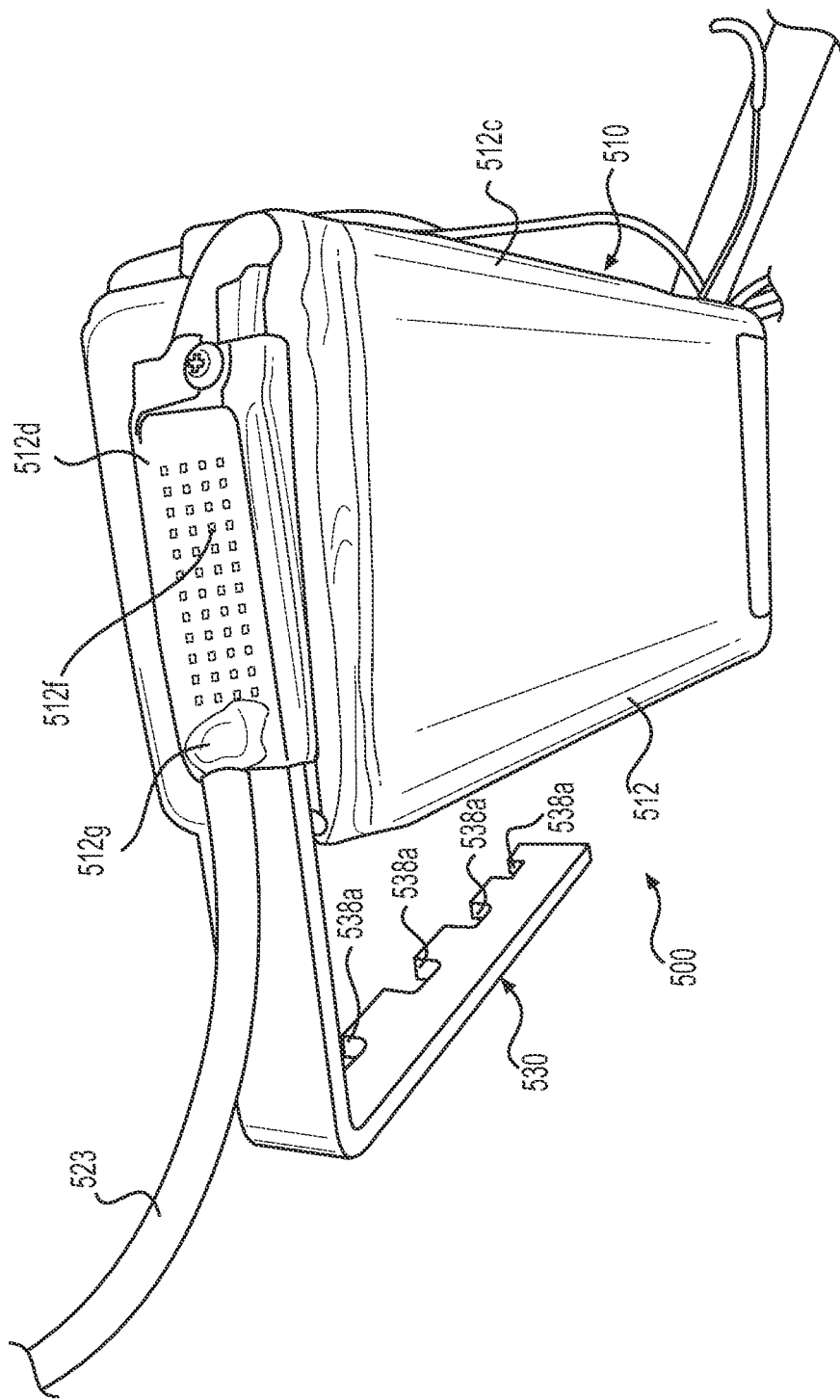
FIG. 34 is an opposite end perspective view of the battery connector device showing a negative tab of the battery wrapped around the negative terminal conductor plate and welded and/or soldered together.

As shown in FIG. 34, the negative battery tab 512d can be attached to the negative terminal conductor bar 530. For example, the separate tab 512e (i.e. a negative separate tab) can be wrapped partially or fully, as shown, around the negative terminal conductor bar 530. The separate tab 512e can be provided with a plurality of through holes 512f to facilitate welding and/or soldering the separate tab 512e to the negative terminal conductor bar 530. For example, the through holes 512f can be square-shaped through holes arranged into a matrix, as shown in FIG. 34. The negative wire 523 is shown connected (e.g. soldered) to the separate tab 512e.

A separate tab 512e (see FIG. 29) can be connected to the negative battery tab 512d to form an extended negative tab, so that the extended negative tab can be wrapped or wound around the negative terminal conductor bar 530 more than one time (e.g. 2, 3, 4, or more times). In this manner, the electrical connection between the negative battery tab 512d and the negative terminal conductor bar 530 can be enhanced. The separate tab 512e can be provided with a layer of solder on one or both sides, so that after the separate tab 512e is wrapped or wound around the negative terminal conductor bar 530, this assembly can be heated up to solder the separate tab 512e onto the negative terminal conductor bar 530.

Figure 35:
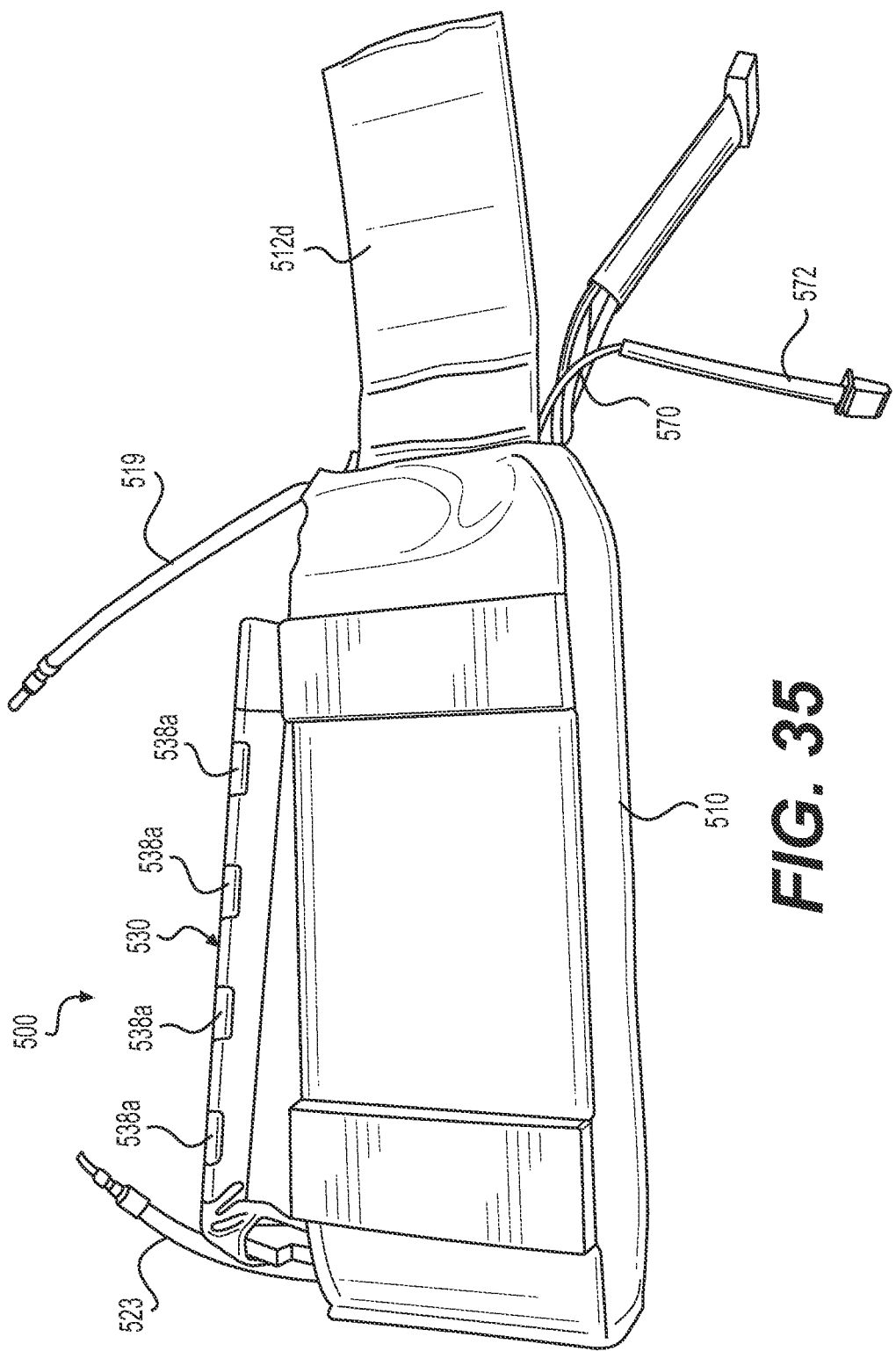
FIG. 35 is a perspective view of the battery connector device showing the flat separate tab connected to the battery and extending outwardly prior to connection to the positive cable.
Figure 36:
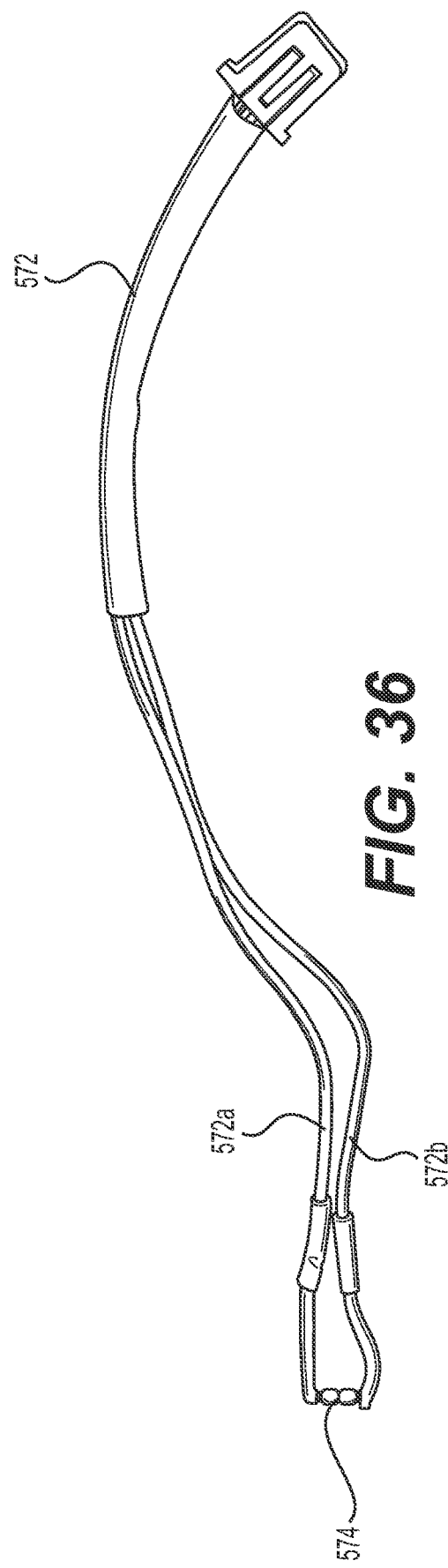
FIG. 36 is a side view of the temperature sensor assembly with wires and connector.

The completed assembly of the enhanced conductivity battery conductor device 500 with the connected positive separate tab 512d ready to be wrapped or wound an exposed end of the positive cable 518 (FIG. 28) can be seen in FIG. 35. The bundle of wires 570 shown in FIG. 35, includes wires 572 for a temperature sensor embedded within the battery 512 (e.g. temperature sensor located near battery tab or between battery cells. The temperature sensor 574 having two (2) wires 572a, 572b is shown in FIG. 36.

Figure 37:
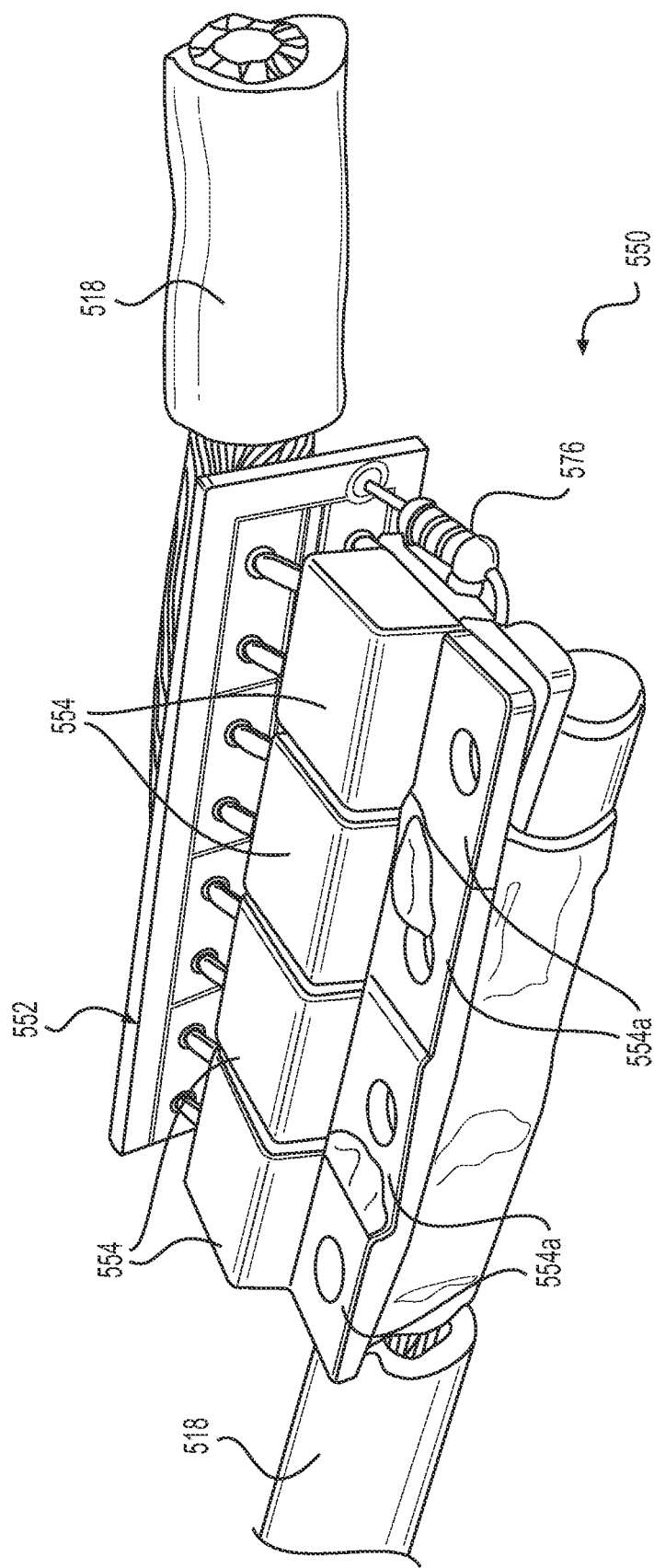
FIG. 37 is a perspective view of the diode circuit board assembled connected inline or spliced into the positive cable.

The enhanced conductivity battery conductor device 500 can comprise a diode connector 550 connected inline or splice into the positive cable 518, as shown in FIG. 37.

The enhanced conductivity battery conductor device 500 comprises a diode circuit board 552 having a plurality of diodes 454 assembled thereon. The diodes 454 each have a diode conductor tab 454a connected (e.g. soldered) to an exposed end of the positive cable 518. The prongs of the diodes 454 extend through holes in the diode circuit board 552, and are soldered to both the conductive traces and exposed end of the positive cable 518 along with a resistor 576 to complete the assembly.

LEGEND

10 Battery jump starting device
12 Casing
12a Upper casing portion
14 Display
16 Light emitting diodes (LEDs)
18 Positive cable
18a Exposed end of positive cable 18
20 Positive clamp
22 Negative cable
22a Exposed conductor end of negative cable 22
24 Negative clamp
100 Battery connector device
110 Battery assembly
112 Battery 112a Battery casing
114 Positive terminal conductor bar
116 Conductive loop
118 Flexible or bent cable portion
120 Flexible outer sleeve portion
124 Grooves
126 Inner flange
128 Sleeve portion
130 Negative terminal conductor bar
132 Negative terminal conductor bar connector portion
132a Slots of negative terminal conductor bar connector portion 132
134 Smart switch battery interface
136 Relay printed circuit board
136a Through holes in relay printed circuit board 136
136b Through holes in relay printed circuit board 136
136c Through holes in relay printed circuit board 136
138 First circuit board conductor bar
138a Through holes in first circuit board conductor bar 138
140 Second circuit board conductor bar
140a Through holes in second circuit board conductor bar
142 Relays
142a Relay anchoring pins in through holes 136a
142b Relay connector pins in through holes 136b
142c Relay connector pins in through holes 136c
150 Diode connection
152 Diode printed circuit board
154 Back-charge diodes
156 Conductor bar
210 Controller assembly
212 Circuit board
214 Circuit board
216 Positive power wire
218 Negative power wire
220 Wire set
222 Connector of wire set 220
226 Wire set
228 Connector of wire set 226
232 Wire set
234 Connector of wire set 232
236 Temperature sensor connector
244 Main user out connector
246 Wire set
248 Main user in connector
250 Wire set connected to circuit board 214
318 Positive cable
318a Positive cable end
318b Inner electrical wire conductor
318e Positive cable section
318f Positive cable section
322 Negative cable
322a Negative cable end
322b Inner electrical wire conductor
322c Outer electrical insulating sheath
322d Bundle of wires
400 Enhanced conductivity battery connector device
410 Battery assembly
412 Battery
414 Positive extension tab
415 Solder
422 Relays
423 Solder
434 Smart switch battery interface
440 Circuit board conductor bar
441 conductor loop of the circuit board conductor bar 440
442c Connector pins
450 Diode connection
452 Diode printed circuit board
454 Diodes
454a Diode conductor tabs
454b Diode conductor prongs
455 Shrink wrap insulator
500 Enhanced conductivity battery conductor device
512 Battery
512c Battery cells
512d Battery tabs
512e Separate tab
512f Through holes in separate tab 512e
518 Positive cable
519 Positive wire
523 Negative wire
530 Negative terminal conductor bar of battery 512
550 Diode connector
552 Diode circuit board
570 Bundle of wires
572 Wires
572a Wire of temperature sensor 574
572b Wire of temperature sensor 574
574 Temperature sensor
576 Resistor

The invention claimed is:

1. A jump starting device, comprising:
a rechargeable battery device, comprising:
a lithium ion rechargeable battery comprising multiple battery cells each having a positive tab and negative tab located at opposite ends of each battery cell, the multiple battery cells being connected together end-to-end along an axis in electrical series along a length of the lithium ion rechargeable battery and folded over each other into a layered battery cell arrangement, one positive tab of one of the multiple battery cells being located at one end of the lithium ion rechargeable battery along the axis and extending outwardly from the one end of the lithium ion rechargeable battery, and one negative tab of one of the multiple battery cells being located at an opposite end of the lithium ion rechargeable battery along the axis and extending outwardly from the opposite end of the lithium ion rechargeable battery, a negative separate tab connected to the negative tab at the opposite end of the lithium ion rechargeable battery;
a positive battery cable having an exposed electrical conductor end connected to the positive tab of the lithium ion rechargeable battery, the exposed electrical conductor end of the positive battery cable extending along the one end and a width of the lithium ion rechargeable battery, and being oriented transversely relative to the length of the lithium ion rechargeable battery, the positive tab of the multiple battery cells being lengthened with a positive separate tab added or connected thereto along the axis to form an extended positive tab in which the positive separate tab is wrapped or wound around the exposed electrical conductor end of the positive battery cable along the axis;
a negative terminal conductor bar connected to the negative tab of the lithium ion rechargeable battery, the negative separate tab wrapping around the negative terminal conductor bar, the negative terminal conductor bar being located at the opposite end and extending along the opposite end and the width of the lithium ion rechargeable battery, and being oriented transversely relative to the length of the lithium ion rechargeable battery; and a negative battery cable connected to or connectable to the negative terminal conductor bar during jump starting operation of the jump starting device;
a positive battery clamp connected to the positive battery cable;
a smart switch controller;
a smart switch interface connected to and controlled by the smart switch controller, the smart switch interface comprising a circuit board having a first circuit board conductor bar connected to the negative terminal conductor bar of the rechargeable lithium ion battery and a second circuit board conductor bar spaced apart from the first circuit board conductor bar on the circuit board, the smart switch interface further comprising one or more relays connected between the first circuit board conductor bar and the second circuit board conductor bar for providing isolation between the negative tab of the rechargeable lithium ion battery and a battery being jump started by the battery jump starting device;
a negative battery cable connected to the second circuit board conductor bar of the smart switch interface; and
a negative battery clamp connected to the negative battery cable.

2. The jump starting device according to claim 1, wherein the exposed electrical conductor end of the positive battery cable is welded and/or soldered to the positive separate tab of the layered battery cell arrangement and the negative terminal conductor bar is soldered to the negative tab of the layered battery cell arrangement.

3. The jump starting device according to claim 1, wherein the rechargeable lithium ion battery is rectangular-shaped, and the negative terminal conductor bar is L-shaped and wraps around a corner of the rechargeable lithium ion battery.

4. The jump starting device according to claim 3, wherein the positive tab and the negative tab of the layered battery cell arrangement extend from opposite ends of the layered battery cell arrangement along the axis and are equal or substantially equal in width to that of the layered battery cell arrangement.

5. The jump starting device according to claim 1, wherein the positive tab and negative tab of the layered battery cell arrangement extend along opposite edges along a width dimension of the layered battery cell arrangement.

6. The jump starting device according to claim 1, wherein the positive separate tab is the same or substantially the same in width to the positive tab of the layered battery cell arrangement.

7. The jump starting device according to claim 1, wherein the positive separate tab at least partially overlaps the positive tab of the layered battery cell arrangement.

8. The jump starting device according to claim 1, wherein the exposed electrical conductor end of the positive battery cable is wound up along the axis within the positive separate tab.

9. The jump starting device according to claim 1, further comprising a negative separate tab connected to the negative tab of the layered battery cell arrangement to extend a length of the negative tab of the layered battery cell arrangement along the axis and form an extended negative tab.

10. The jump starting device according to claim 9, wherein the negative separate tab of the extended negative tab of the layered battery cell arrangement wraps more than one time around the negative terminal conductor bar to enhance an electrical connection between the negative terminal conductor bar and extended negative tab of the layered battery cell arrangement.

11. The jump starting device according to claim 1, wherein the exposed electrical conductor end of the positive battery cable is welded and/or soldered to the extension tab of the layered battery cell arrangement and the negative terminal conductor bar is welded and/or soldered to the negative tab of the layered battery cell arrangement.

12. The jump starting device according to claim 11, wherein the negative separate tab is provided with a plurality of through holes to enhance welding and/or soldering the negative separate tab to the negative terminal conductor bar.

13. The jump starting device according to claim 12, wherein the plurality of through holes are square-shaped through holes arranged into a matrix.

14. The jump starting device according to claim 1, wherein the layered battery cell arrangement is taped or shrink wrapped together.

15. The jump starting device according to claim 1, wherein the layered battery cell arrangement is placed within a battery cover or casing.

16. The jump starting device according to claim 1, wherein the exposed electrical conductor end of the positive battery cable is wound or wrapped around the positive separate tab and extends along a width of the layered battery cell arrangement.

17. The jump starting device according to claim 16, wherein the positive separate tab fully wraps around the exposed electrical conductor end of the positive battery cable.

18. The jump starting device according to claim 17, wherein at least a portion of a length of the negative terminal conductor bar connecting to the negative tab extends along the width of the layered battery cell arrangement.

19. The jump starting device according to claim 18, wherein the negative tab extends from one end of the layered battery cell arrangement along the axis and wraps around the at least a portion of the length of the negative terminal conductor bar.

20. A jump starting device, the jump starting device comprising:
a positive battery cable and a negative battery cable;
a rechargeable battery device comprising a lithium ion rechargeable battery comprising multiple battery cells connected end-to-end along an axis in electrical series and folded into a layered battery cell arrangement having a positive tab of one of the multiple battery cells located at one end of the lithium ion rechargeable battery along the axis and a negative tab of one of the multiple battery cells located at an opposite end of the lithium ion rechargeable battery along the axis, a negative separate tab connected to the negative tab at the opposite end of the lithium ion rechargeable battery;
a negative terminal conductor bar connected to the negative tab at the opposite end of the lithium ion rechargeable battery, the negative separate tab wrapping around the negative terminal conductor bar;
a positive battery clamp connected to the positive battery cable;
a smart switch controller;
a smart switch interface connected to and controlled by the smart switch controller, the smart switch interface comprising a circuit board having a first circuit board conductor bar connected to a negative terminal conductor bar of the lithium ion rechargeable battery and a second circuit board conductor bar spaced apart from the first circuit board conductor bar on the circuit board, the smart switch interface further comprising one or more relays connected between the first circuit board conductor bar and the second circuit board conductor bar for providing isolation between the negative tab of the lithium ion rechargeable battery and a battery being jump started by the jump starting device; and
a negative battery cable connected to the second circuit board conductor bar of the smart switch interface; and
a negative battery clamp connected to the negative battery cable,
   wherein the positive tab is lengthened with a positive extension tab added or connected thereto along the axis to form an extended positive tab that is wrapped or wound around an exposed electrical conductor end of the positive battery cable along the axis,
   the exposed electrical conductor end being oriented transversely relative to a length of the lithium ion rechargeable battery, and
      wherein the negative battery cable is connected or connectable to the negative tab during operation of the rechargeable battery device.

21. The jump starting device according to claim 20, wherein at least a portion of the length of the negative terminal conductor bar is oriented transversely relative to the layered battery cell arrangement.

22. The jump starting device according to claim 21, wherein the negative separate tab wraps around the at least a portion of the length of the negative terminal conductor bar for enhancing an electrical connection between the layered battery cell arrangement and the negative terminal conductor bar.

23. The jump starting device according to claim 22, wherein the exposed electrical conductor end of the positive battery cable and the negative terminal conductor bar are located at opposite ends of the layered battery cell arrangement along the axis.

24. A jump starting device, comprising:
a rechargeable lithium ion battery pack comprising multiple battery cells each having a positive tab and negative tab, the multiple battery cells being connected end-to-end along an axis in electrical series and folded over each other into a layered battery cell arrangement providing a positive tab located at one end of the rechargeable lithium ion battery pack along the axis and one negative tab located at an opposite end of the rechargeable lithium ion battery pack along the axis, the multiple battery cells being connected together in electrical series by welding and/or soldering respective positive and negative tabs together and positioned so as to overlap each other;
a positive separate tab connected to the positive tab of the multiple battery cells to lengthen the positive tab of the multiple battery cells along the axis to form an extended positive tab upon the multiple battery cells;
a negative separate tab connected to the negative tab at the opposite end of the rechargeable lithium ion battery pack;
a positive battery cable having an exposed electrical conductor end connected to the positive separate tab of the extended positive tab of a terminal battery cell of the multiple battery cells, the exposed electrical conductor end of the positive battery cable being oriented transversely relative to a length of the rechargeable lithium ion battery pack, the positive separate tab being wrapped or wound around the exposed electrical conductor end of the positive battery cable along the axis and the extension tab being welded and/or soldered to the exposed electrical conductor end of the positive battery cable;
a negative terminal conductor bar directly connected to the negative tab of the rechargeable lithium ion battery pack, the negative terminal conductor bar being oriented transversely relative to the length of the rechargeable lithium ion battery pack, the negative separate tab wrapping around the negative terminal conductor bar;
a negative battery cable connected to or connectable to the negative terminal conductor bar during jump starting operation of the jump starting device;
a positive battery clamp connected to the positive battery cable;
a smart switch controller;
a smart switch interface connected to and controlled by the smart switch controller, the smart switch interface comprising a circuit board having a first circuit board conductor bar connected to the negative terminal conductor bar of the rechargeable lithium ion battery pack and a second circuit board conductor bar spaced apart from the first circuit board conductor bar on the circuit board, the smart switch interface further comprising one or more relays connected between the first circuit board conductor bar and the second circuit board conductor bar for providing isolation between the negative tab of the rechargeable lithium ion battery pack and a battery being jump started by the jump starting device;
a negative battery cable connected to the second circuit board conductor bar of the smart switch interface; and
a negative battery clamp connected to the negative battery cable.

25. A jump starting device, comprising:
a rechargeable battery device, comprising:
   a rechargeable lithium ion battery pack comprising multiple battery cells connected end-to-end along an axis in an electrical series battery cell arrangement providing a positive tab located at one end of the rechargeable lithium ion battery pack along the axis and one negative tab located at an opposite end of the rechargeable lithium ion battery pack along the axis;
      wherein the positive tab is lengthened with a positive separate tab added or connected thereto along the axis to form an extended positive tab;
      wherein the negative tab is lengthened with a negative separate tab added or connected thereto along the axis to form an extended negative tab;
   a positive battery cable having an exposed conductor end connected to the extended positive tab of the extended positive tab of the electrical series battery cell arrangement within the rechargeable lithium ion battery pack, the exposed electrical conductor end of the positive battery cable being oriented transversely relative to a length of the electrical series battery cell arrangement;
      wherein the extended positive tab is wrapped or wound around the exposed electrical conductor end of the positive battery cable along the axis;
   a negative terminal conductor bar connected to the negative tab of the electrical series battery cell arrangement of the rechargeable lithium ion battery pack, at least a portion of the negative terminal conductor bar being oriented transversely relative to the length of the electrical series battery cell arrangement, the extended negative tab wrapping around the negative terminal conductor bar;
   a positive battery clamp connected to the positive battery cable;
   a smart switch controller;

a smart switch interface connected to and controlled by the smart switch controller, the smart switch interface comprising a circuit board having a first circuit board conductor bar connected to the negative terminal conductor bar of the rechargeable lithium ion battery pack and a second circuit board conductor bar spaced apart from the first circuit board conductor bar on the circuit board, the smart switch interface further comprising one or more relays connected between the first circuit board conductor bar and the second circuit board conductor bar for providing isolation between the negative tab of the rechargeable lithium ion battery pack and a battery being jump started by the jump starting device;

a negative battery cable connected to the second circuit board conductor bar of the smart switch interface; and a negative battery clamp connected to the negative battery cable.

26. The jump starting device according to claim 25, wherein the exposed conductor end of the positive battery cable is soldered to the extended positive tab of the electrical series battery cell arrangement and the negative terminal conductor bar is welded and/or soldered to the extended negative tab of the electrical series battery cell arrangement.

27. A jump starting device, comprising:

a lithium ion rechargeable battery comprising multiple battery cells each having a positive tab and a negative tab located at opposite ends of each battery cell along an axis thereof, the multiple battery cells being connected together end-to-end along the axis in electrical series along a length of the lithium ion rechargeable battery and folded over each other into a layered battery cell arrangement, wherein a positive tab of the multiple battery cells is located along the axis and extends outwardly from one end of the lithium ion rechargeable battery, and wherein one negative tab of the multiple battery cells is located along the axis and extends outwardly from an opposite end of the lithium ion rechargeable battery;

wherein the positive tab of a terminal battery cell of the multiple battery cells within the lithium ion rechargeable battery is lengthened with a positive separate tab added or connected thereto along the axis to form an extended positive tab;

wherein the negative tab of a separate terminal battery cell of the multiple battery cells within the lithium ion rechargeable battery is lengthened with a negative separate tab added or connected thereto along the axis to form an extended negative tab;

a positive battery cable having an exposed electrical conductor end connected to the extended positive tab, the exposed electrical conductor end of the positive battery cable being connected at the one end and along a width of the lithium ion rechargeable battery and oriented transversely relative to the length of the lithium ion rechargeable battery, the extended positive tab of the lithium ion rechargeable battery being wrapped or wound around the exposed electrical conductor end of the positive battery cable along the axis;

a negative terminal conductor bar connected to the one negative tab of the multiple battery cells of the lithium ion rechargeable battery, the extended negative tab wrapping around the negative terminal conductor bar;

a negative battery cable connected to or connectable to the negative terminal conductor bar during jump starting operation of the jump starting device;

a positive battery clamp connected to the positive battery cable;

a smart switch controller;

a smart switch interface connected to and controlled by the smart switch controller, the smart switch interface comprising a circuit board having a first circuit board conductor bar connected to the negative terminal conductor bar of the lithium ion rechargeable battery and a second circuit board conductor bar spaced apart from the first circuit board conductor bar on the circuit board, the smart switch interface further comprising one or more relays connected between the first circuit board conductor bar and the second circuit board conductor bar for providing isolation between the negative tab of the lithium ion rechargeable battery and a battery being jump started by the jump starting device;

a negative battery cable connected to the second circuit board conductor bar of the smart switch interface; and a negative battery clamp connected to the negative battery cable.

* * * * *